US012769152B2

(12) United States Patent
Galstian

(10) Patent No.: US 12,769,152 B2
(45) Date of Patent: Oct. 20, 2026

(54) ELECTRODE STRUCTURE FOR FOVEAL LENS DEVICE

(71) Applicant: UNIVERSITÉ LAVAL, Québec (CA)

(72) Inventor: Tigran Galstian, Québec (CA)

( * ) Notice: Subject to any disclaimer, the term of this patent is extended or adjusted under 35 U.S.C. 154(b) by 328 days.

(21) Appl. No.: 18/539,419

(22) Filed: Dec. 14, 2023

(65) Prior Publication Data

US 2024/0192524 A1 Jun. 13, 2024

Related U.S. Application Data

(63) Continuation of application No. PCT/CA2022/050959, filed on Jun. 15, 2022.

(60) Provisional application No. 63/211,396, filed on Jun. 16, 2021.

(51) Int. Cl.
*G02C 7/08* (2006.01)
*G02F 1/29* (2006.01)

(52) U.S. Cl.
CPC ............... *G02C 7/083* (2013.01); *G02F 1/29* (2013.01)

(58) Field of Classification Search
CPC ....... G02C 7/083; G02F 1/29; G02F 2203/28; G02F 1/134309; G02F 1/294
See application file for complete search history.

(56) References Cited

U.S. PATENT DOCUMENTS 3,741,629 A 6/1973 Kahn
6,621,102 B2 9/2003 Hirakata et al.
8,421,990 B2 4/2013 Biring
9,201,285 B2 12/2015 Galstian et al.
2002/0113921 A1* 8/2002 Jiang .................... G02B 5/3016 349/96
2013/0250197 A1* 9/2013 Khodadad ........... G02F 1/13306 349/33
2014/0055716 A1 2/2014 Zhang
2015/0015839 A1* 1/2015 Chin ..................... G02F 1/1343 349/123
2022/0350147 A1* 11/2022 Ouderkirk .......... G02B 27/0093

FOREIGN PATENT DOCUMENTS

EP 2297747 A2 3/2011
KR 20120062602 A 6/2012
KR 20120124344 A 11/2012

(Continued)

OTHER PUBLICATIONS

Corresponding European application No. 22823733.5 extended European search report dated Apr. 11, 2025.

(Continued)

*Primary Examiner* — Mariam Qureshi
(74) *Attorney, Agent, or Firm* — Anglehart et al.

(57) ABSTRACT

A liquid crystal gradient index refractive device has opposed substrates containing liquid crystal with a first serpentine electrode arrangement on a first one of the substrates and an opposed electrode on a second one of the substrates. The first serpentine electrode arrangement has a plurality of contact points within an aperture defined by the first serpentine electrode arrangement. The electric field provided by the first serpentine electrode arrangement allows for the formation of a variation in the electric field in a direction at a desired position within the aperture selected by which ones of the plurality of contact points are driven.

19 Claims, 21 Drawing Sheets

(56) References Cited

FOREIGN PATENT DOCUMENTS

| | | | |
|---|---|---|---|
| RU | 2719341 | C1 | 4/2020 |
| WO | 2016/082031 | A1 | 6/2016 |
| WO | 2017/040067 | A1 | 3/2017 |
| WO | 2017/041167 | A1 | 3/2017 |

OTHER PUBLICATIONS

Loktev, M.Y., et al., Wave front control systems based on modal liquid crystal lenses. Review of scientific instruments, 2000. 71(9): p. 3290-3297.

Andrew K. Kirby, et al., Liquid crystal multi-mode lenses and axicons based on electronic phase shift control. Optics Express, vol. 15, No. 21, Oct. 17, 2007.

Algorri et al., Modal liquid crystal array of optical elements. published in Oct. 21, 2013 | vol. 21, No. 21 | DOI: 10.1364/OE.21.024809 | Optics Express, 24809-24818.

L. Begel and T. Galstian, Dynamic generation of non-diffracting beams by using an electrically variable liquid crystal lens, 441, pp. 127-131, Optics Communications, 2019.

Li, L., D. Bryant, and P.J. Bos, Liquid crystal lens with concentric electrodes and inter-electrode resistors. Liquid Crystals Reviews, 2014. 2(2): p. 130-154.

J. Robertson, High dielectric constant oxides, Eur. Phys. J. Appl. Phys. 28, 265-291 (2004)).

International application No. PCT/CA2022/050959 International Search Report dated Oct. 3, 2022.

International application No. PCT/CA2022/050959 Search Strategy dated Oct. 3, 2022.

International application No. PCT/CA2022/050959 Written Opinion of the International Searching Authority dated Oct. 3, 2022.

International application No. PCT/CA2022/050958 International Search Report dated Oct. 12, 2022.

International application No. PCT/CA2022/050958 Search Strategy dated Oct. 12, 2022.

International application No. PCT/CA2022/050958 Written Opinion of the International Searching Authority dated Oct. 12, 2022.

* cited by examiner

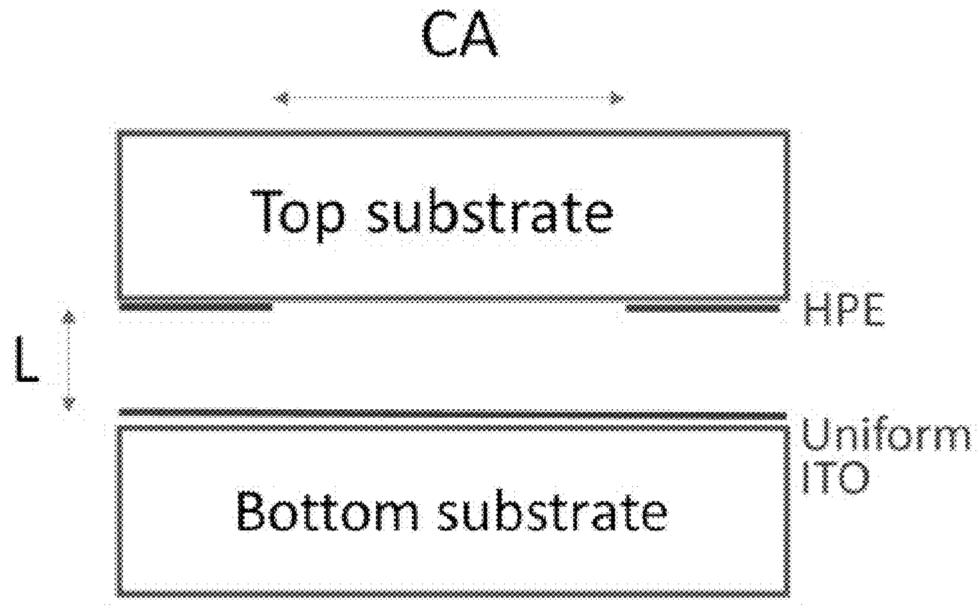
Fig.1a. Side view (prior art)
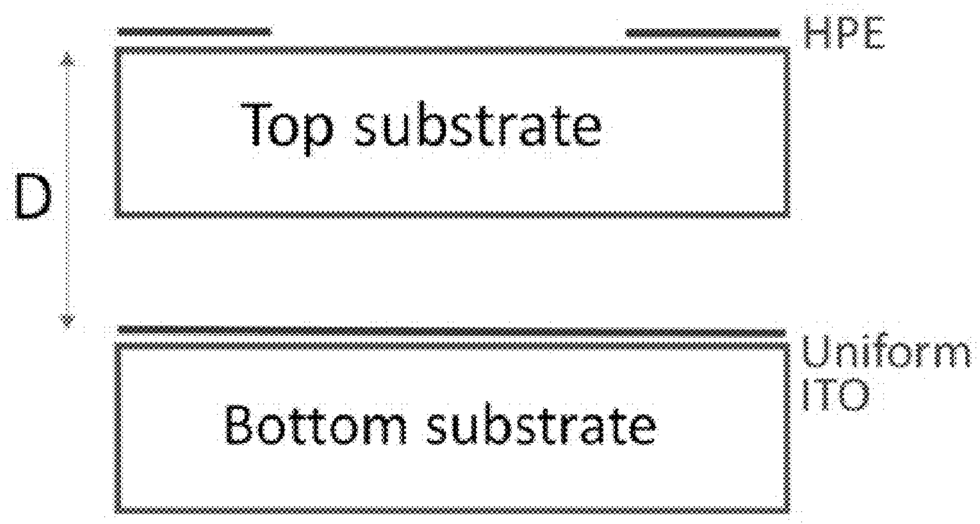
Fig.1b. Side view (prior art)

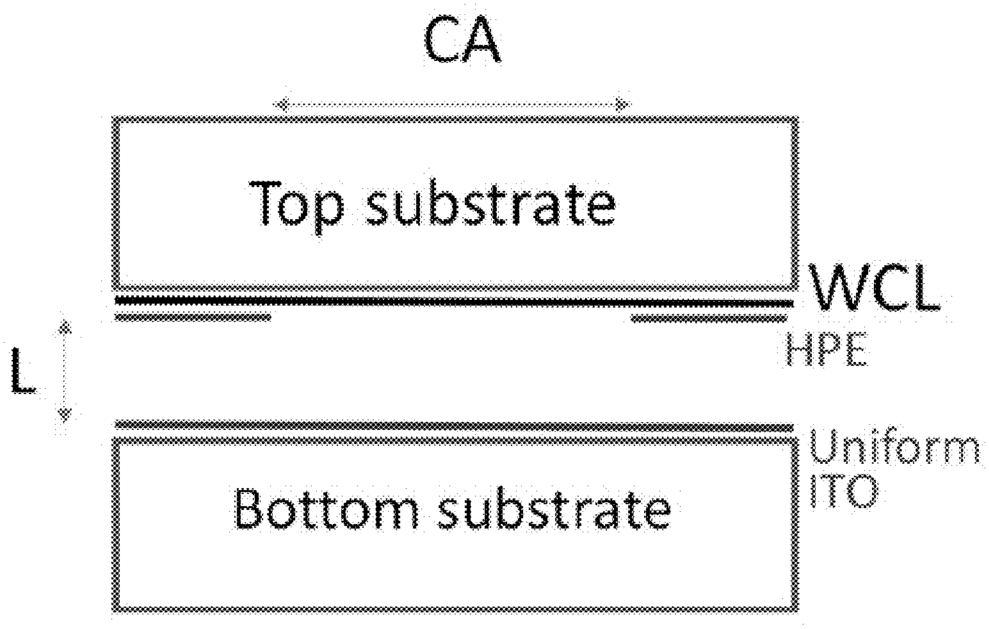
Fig.2. Side view (prior art)

ELECTRODE STRUCTURE FOR FOVEAL LENS DEVICE

CROSS-REFERENCE TO RELATED APPLICATIONS

This application is a continuation of PCT application serial number PCT/CA2022/050959, filed Jun. 15, 2022, designating the US, now pending that claims priority from U.S. Provisional Patent Application 63/211,396 filed Jun. 16, 2021, the contents of which are hereby incorporated by reference.

TECHNICAL FIELD

The present patent application relates to liquid crystal optical devices.

BACKGROUND

Optical gradient index devices are well known in the prior art, e.g., gradient index lenses and prisms (Moore, D. T., *Gradient-index optics: a review*. Applied Optics, 1980. 19(7): p. 1035-1038). Making these devices adaptable (enabling the dynamic change of their gradient) can increase significantly their functionality and efficiency. This would require optical materials that are sensitive to external stimuli. Various materials, including liquid crystals (LC) are sensitive to such stimuli, e.g., electric or magnetic fields (de Gennes, P.-G. and J. Prost, *The physics of liquid crystals*. Oxford University Press, USA, 1995. 2: p. 4). Thus, we could use electric field gradients to obtain the desired profile of refractive index by using LC materials (e.g., to build an electrically tunable LC lens or TLCL).

Indeed, different techniques have been developed to obtain such a gradient of electric field. One of the most straightforward ways is the use of patterned (circular, to obtain a lens, or linear, to obtain a prism) electrodes in a sandwich device (made of two substrates) containing the LC material. In the case of a lens-type device, one of its substrates is usually covered by a uniform transparent electrode (indium tin oxide or ITO), while the second one has a hole patterned electrode (HPE), FIG. 1*a*. In this case, the electric field will be strong in the periphery (where the HPE is facing the uniform ITO electrode) and will be decreasing when we consider positions closer to the center of the device (far from the HPE). The electric field's decrease will be gradual at distances comparable with the separation D (shown on FIG. 1*b*) of two electrode planes (thanks to the so-called «fringing field» effect), but it will be significant if the diameter of the HPE (or the clear aperture, CA, of the device, shown on FIG. 1*a*) is much larger compared to the D (in FIG. 1*a*, we have a case when D=L, where L is the thickness of the LC layer). Thus, the electric field's profile, the reaction of the LC and the corresponding profile of the refractive index gradient will be defined by the ratio of CA over D. In fact, it was shown that the best ratio R=CA/D should be at the order of 2.5 to have a soft change of the electric gradient allowing the generation of an optical gradient index lens with acceptable aberrations (Sato, S., *Applications of liquid crystals to variable-focusing lenses*. Optical Review, 1999. 6(6): p. 471-485.)

However, there are several limitations here: the choice of the thickness L of the LC is usually limited (L must be relatively small because of light scattering and relaxation time requirements) and the separation of electrodes D must be as small as possible to limit voltages U required to generate enough electric field E (where E=U/D) to reorient LC molecules. This limitation is related to the electrical power consumption of the device which is proportional to the square of the voltage applied to the device. For example, FIG. 1*b* demonstrate a case, where, instead of increasing the L, the top HPE electrode layer is shifted further (outside of the LC sandwich) to keep the ratio R optimal (for a given CA), but further are these electrodes higher will be the voltage to drive the device.

This is the reason why we cannot use the «fringing field» approach for relatively large values of CA, e.g., in the range from 0.5 mm to 50 mm, or specifically, in the range from 0.5 mm to 10 mm, used for imaging, ophthalmic and augmented reality applications. It may be useful to notice that such TLCLs or LC gradient index (LC-GRIN) lenses can generally be characterized as having an optical power (focusing capability) that is inversely proportional to the aperture CA. While, in some optical imaging systems, the aperture must be much larger. Thus, the traditional LC-GRIN lens can not provide a noticeable optical power variation range. This is limiting the application of these devices in systems with large CA. Solutions have been proposed to increase the optical power at larger apertures in LC-GRIN lenses, such as to have the same lens operate as a both negative lens and then as a positive lens. However, the clear aperture size requirements remain still a problem if we try to generate a tunable lens over the entire CA.

Various solutions have been proposed to build devices with millimetric range of CA. One approach uses a high resistivity or weakly conductive layer (WCL) next to the HPE to help further propagate the fringing field towards the center of the device (Kahn, F., Electronically variable iris or stop mechanisms. 1973, US patent; Loktev, M. Y., et al., Wave front control systems based on modal liquid crystal lenses. Review of scientific instruments, 2000. 71(9): p. 3290-3297), FIG. 2. However, for millimetric size CAs, the sheet resistance value Rs for such a layer is in the Mega Ohm (per square) region and it is extremely difficult to produce uniform layers with such Rs in a reproducible way and to insure that they are environmentally stable (since very often a non-stochiometric/incomplete oxidation of metals must be maintained to obtain such Rs values).

An approach to resolving the problem of using a high resistance layer (or WCL) associated with a hole-patterned electrode for creating a spatial distribution of voltage was proposed in the paper titled "Liquid crystal multi-mode lenses and axicons based on electronic phase shift control" by Andrew K. Kirby, Philip J. W. Hands, and Gordon D. Love, published in Optics Express, Vol. 15, No. 21, 17 Oct. 2007. In this paper, an ITO film is placed on the surface of one substrate and used in conjunction with two strip electrodes placed on opposed sides of the substrate and driven by phase-shifted voltages. The use of different phases of drive signals, applied to the strip electrodes, has been found to create a spatial distribution of voltage when the electrode on the opposed substrate is grounded such that the arrangement produces a cylindrical lens between the strip electrodes. As reported in the paper, when the opposed substrate also has orthogonally arranged strip electrodes (rotated at 90 degrees with respect to the previous strips of the first substrate), a second pair of driving voltages can be used to create a combination of cylindrical spatial distribution of electric fields that provide for a tunable spherical lens. However, given that signals of opposed phase (e.g., +5 V and −5 V) are simultaneously applied at the opposed edges of a relatively good conductor (the uniform ITO), significant electrical current flows through the ITO increasing dramatically the power consumption of the device.

In the paper by Algorri and Love (published in 21 Oct. 2013|Vol. 21, No. 21|DOI:10.1364/OE.21.024809|OPTICS EXPRESS 24809), a WCL is added to a similar lens design that provides for a 4 lens units with 6 electrode stripes (3 on each substrate) driven with various amplitudes and phase shifted signals. However, this approach re-introduces the problem of needing a WCL.

LC optical devices are well known in the art that dynamically modulate beams. For example, PCT patent application publication WO2017/040067, published on 16 Mar. 2017, describes a variety of optical arrangements including LC devices that will broaden a beam. In PCT patent application publication WO2016/082031, published on 2 Jun. 2016, a variety of optical arrangements including LC devices are described for steering a beam.

SUMMARY

Applicant has discovered that the problem of electric field discontinuity due to a discrete electrode arrangement in an LC-GRIN (or TLCL) optical device having a stepped voltage distribution in space can be solved by the use of phase shifted drive signals while using discrete shaped electrodes or by the use of a relatively high dielectric constant layer (HDCL), placed near the stepped electrode, which can "smoothen" the electric potential profile and reduce the artifacts due to the steps in electric field caused by the discrete turns or steps of the stepped electrode. Such HDCLs may be fabricated much easier compared to WCLs (some examples of suitable HDCL materials can be found in the article titled "High dielectric constant oxides" by J. Robertson, published on 2 Dec. 2004 in The European Physical Journal—Applied Physics). Examples of stepped electrode designs are found in the previously mentioned prior art and can include different designs as disclosed hereinbelow. While most polymers and glass have a dielectric constant $\varepsilon$ in the range of 4 to 6 (air has a dielectric constant of 1), it has been found that transparent materials having a dielectric constant of about $\varepsilon=20$ or greater can be applied to the discrete (stepped) spiral or circular or linear serpentine shaped electrodes with the effect that the resulting electric field does not cause the LC to exhibit artefacts caused by the spatial steps in the voltage of the electrode. An alternative "smoothening" effect can be obtained also if we apply phase shifted signals to the opposed edges of these discrete electrodes. The combination of both approaches can be even more beneficial.

The use of an HDCL can likewise be used also with a network of capacitively-coupled electrodes with a similar "smoothening" effect, while the discretization in this case may be of less importance, making even possible the use of capacitively coupled electrodes with appropriate modifications and without the HDCL, in applications and embodiments we shall describe hereafter.

In one example, Applicant used a coating of $Ti_3O_5$, cast on a suitably shaped ITO electrode spiral. The $Ti_3O_5$ layer was 100 nm thick in the example. Such a coating demonstrated significant improvement in the electric potential's profile to make the transmitted light wavefront's modulation soft enough to be acceptable for imaging applications. Other solid material candidates (for the HDCL) may be also metal oxides, such as Hafnium Oxide ($HfO_2$), $Ta_2O_5$, $ZrO_2$, etc.

The case of $HfO_2$ may be particularly interesting and useful since, in addition of having $\varepsilon=20$, it may be fabricated to have a refractive index $n_{HfO}$ that is very close to the refractive index of ITO, $N_{ITo}\approx N_{HfO}$, which may be between 1.6 and 1.9. This may enable the fabrication of index matched layers (by optically "hiding" the ITO pattern) that would minimize Fresnel reflections and diffraction of light from the combined layer of the patterned ITO and HDCL.

In some embodiments, an LC-GRIN cell device has two opposed substrates containing LC material with a uniform electrode arrangement on a first one of the substrates and a stepped electrode arrangement and a HDCL, placed near the stepped electrode arrangement, on a second one of the substrates.

In some other embodiments, an LC-GRIN cell device has opposed substrates of the second type; that is, the first substrate has a stepped electrode arrangement and an HDCL and a second stepped electrode and an HDCL are present also on the second substrates.

In some other embodiments, the above-mentioned LC-GRIN devices may be built without the HDCL and driven with specific phase shifted electrical signals to smoothen the electric field's profile (by field averaging in time).

The device can include an alignment structure, film or layer, so that the LC is well-aligned in a ground state, such as a rubbed surface coating for planar alignment or homeotropic substrate bonding for homeotropic alignment. Stepped electrode arrangements can include continuous or discontinuous spiral, continuous or discontinuous serpentine electrodes, capacitively coupled segments or rings, individually driven electrode rings or segments, etc. The device can be a circular or cylindrical lens, a beam steering device or a beam broadening or scattering device.

Applicant has further discovered that the problem of providing an electrode arrangement that will produce a desired electric field spatial distribution in an LC-GRIN lens can be solved by linear stepped electrode arrangements provided on opposed substrates of an LC cell and oriented orthogonal to each other. In such a design, while each arrangement of electrodes on each separate substrate provides a cylindrical electric field distribution and the combination of the two arrangements (driven appropriately with phase shifted signals and averaged in time) yields a suitable spherical distribution. The desired LC spatial distribution can be controlled by the arrangement of electrodes, for example the spacing of the electrode segments, resistance or capacitive coupling between segments, the thickness of the LC layer, its dielectric parameters, etc. will influence the shape of the electric field generated.

Unlike WCL coated hole-patterned electrodes whose electric field is difficult to control precisely over the device aperture, orthogonally-arranged, opposed linear stepped electrode arrangements can be printed or laid-out to have a desired voltage drop across the aperture. Unlike individual powering of concentric ring electrodes for a circular lens, drive signals can be supplied to the stepped electrodes from outside the aperture without creating cut-line artefacts.

In some embodiments, an LC-GRIN lens device has opposed substrates (containing LC) with linear stepped electrode arrangements provided on opposed substrates orthogonal to each other. The device can include an alignment structure so that the LC is ordered in a ground state, such as a rubbed surface coating for planar alignment or homeotropic substrate bonding for homeotropic alignment. Stepped electrode arrangements can include serpentine electrodes, capacitively coupled segments or rings, individually driven electrode segments, etc.

Applicant has further discovered that the problem of providing good optical power of an LC-GRIN lens in an optical system having a large aperture can be solved by providing an LC-GRIN lens device with an electrode arrangement that permits the formation of a lens at a variable position within the entire optical window of the lens device. While LC-GRIN lenses with segmented circular electrodes are known (see, e.g., L. Begel and T. Galstian, Dynamic generation of non-diffracting beams by using an electrically variable liquid crystal lens, 441, pp. 127-131, Optics Communications, 2019.) that can have an optical axis that is slightly (significantly less than the diameter of the lens) moved by adjusting voltages applied to segmented electrodes for the purposes of optical image stabilization, the selective powering of different segments of an electrode arrangement to have a lens move (more than its diameter) is not known in the art. Indeed, such selective powering can be used to move a lens within the device by a distance greater than the radius of the lens and typically greater than the diameter of the lens. It can also be used to change the size of the lens and its profile to generate various forms of desired aberrations, an axicon, a prism, a cylindrical lens, Powell lens, etc. It is important to mention that the anamorphic (or Matrix, or Foveal) lens design disclosed herein allows for almost any desired waveform to be created, including positive and/or negative, circular and/or cylindrical lenses, prisms, axicons, etc. This is done by using significantly less (at least by an order of magnitude) actively controlled electrodes compared to spatial light modulators (SLMs).

In some embodiments, an LC-GRIN lens device with an electrode arrangement that permits the formation of a lens at a variable position within the lens device that has linear electrode arrangements provided on opposed substrates orthogonal to each other that can be individually powered to define the location of the formation of the lens, wherein the electric field provided by each linear electrode arrangement on each substrate allows for the formation of a cylindrical variation in the electric field, the combination of which can be used to form a circular lens when the electrical drive signals are phase shifted. The device can include an alignment structure so that the LC is ordered in a ground state, such as a rubbed surface coating for planar alignment or homeotropic substrate bonding for homeotropic alignment. The strip electrode arrangements can include thin strips only, or thin strips laid on an HDCL or a WCL or highly resistive layer, continuous or discontinuous serpentine electrodes, capacitively coupled segments or rings, individually driven electrode segments, etc.

Such a lens device can form one or simultaneously multiple lenses having a diameter of about 0.5 mm to about 10 mm, with positioning of the lens within the full aperture of the device being from about every 0.1 mm to about every 1 mm. The total size of the device (the optical window within which the above-mentioned lens can be created and shifted) is not essentially limited except by the application; for example, it can be several centimeters large if needed.

Furthermore, the driving of the above-mentioned millimetric lenses may be achieved either by applying a continuous sequence of signals or may be time sequenced (as it is done in traditional LC display or LCD industry) to obtain “local” responses over the desired coordinates (positions) on the surface of above-mentioned large (multiple centimeter sized) device. Indeed, as it is well known in the traditional LCD industry (sec, e.g., P. J. Collings and J. S. Patel, Handbook of Liquid Crystal Research, Oxford University Press, 1997), the application of time sequenced electrical signals to various electrode contacts will enable the generation of the lens effect mainly in desired (restricted in space) areas of the entire optical window, keeping the rest of the window almost unchanged. Alternatively, multiple additional electrodes may be activated within and outside of the currently created lens area to improve the lens profile or to reduce the overall peripheral distortion effects.

In the application of such an LC-GRIN lens device in panoramic or fish-eye cameras, a movement detection can be incorporated to enable the identification of a specific area of the tunable LC-GRIN lens to be activated enabling, for example, the increase of resolution or modulation of distortion in specific desired direction, e.g., for surveillance purposes, etc.

In the ophthalmic eyeglasses distance accommodation or virtual reality application of eyeglasses, such an LC-GRIN lens device can be controlled to cause a near focus/far focus lens to appear at a location defined by the direction where the user is looking. These devices can include an eye-tracking component or components so that the lens can be created to appear in the direction of viewing. Eye-tracking of each eye can be used to determine the direction and the focal depth for the purposes of determining an appropriate clear aperture and a desired optical power of the tunable lens. While such eyeglasses can require electrical power, programmable eyeglasses can be provided that may be used in addition to prescription lenses or that may replace prescription lenses. Such corrective lenses can correct for astigmatism, myopia and/or presbyopia. The remote control of drive parameters can allow doctors to adjust and optimize the performance of such glasses during an ophthalmic check-up. When such eyeglasses provide two spaced-apart LC-GRIN devices, two lenses can be caused to appear before the user’s eyes such that magnification (optical zoom) of the image can be provided.

A first aspect is a liquid crystal gradient index device including: opposed substrates containing liquid crystal with a first serpentine electrode arrangement on a first one of the substrates and an opposed electrode on a second one of the substrates, wherein the first serpentine electrode arrangement includes a plurality of contact points within an aperture defined by the first serpentine electrode arrangement; wherein the electric field provided by the first serpentine electrode arrangement allows for the formation of a variation in the electric field in a direction at a desired position, for example at a lateral position, within the aperture selected by which ones of the plurality of contact points are driven.

In some embodiments, the opposed electrode is a second similar serpentine electrode arrangement, rotated at 90° with respect to the first serpentine electrode arrangement.

In some embodiments, the serpentine electrode arrangement includes a transparent electrode material.

In some embodiments, the substrates include an alignment layer providing the liquid crystal with a planar ground state alignment (e.g., a standard planar ground state alignment) in a direction diagonal to the serpentine electrode arrangement.

In some embodiments, the substrates include glass.

In some embodiments, the substrates include a flexible, transparent plastic material.

In some embodiments, the device includes a plurality of liquid crystal layers arranged for polarization-independent operation.

In some embodiments, the device includes a plurality of liquid crystal layers arranged for polarization-independent and large angle operation.

In some embodiments, the electrode is almost transparent and is made of indium tin oxide, zinc oxide, graphene, or other materials with similar performance.

In some embodiments, the liquid crystal is a nematic liquid crystal that is aligned in the direction of the diagonal between two serpentine electrodes, almost parallel to cell substrates with a small pretilt angle to insure a disclination-free operation.

In some embodiments, the substrates are made of transparent glass or plastic or other materials with similar performance.

In some embodiments, a device includes two similar devices which are assembled with 90° rotation to ensure polarization independent operation.

In some embodiments, the plurality of contact points allow for at least 5 of the desired positions.

In some embodiments, the contact points define a minimal step between the desired position of the lens equal or above 0.1 mm, for example a minimal step of 0.5 mm.

In some embodiments, the device further includes switch circuitry connected to contact points of at least one of the first and the second serpentine electrodes.

In some embodiments, the device further includes a drive circuit connected to the switch circuitry for selectively driving the contact points.

In some embodiments, the drive circuit provides selected phase and frequency drive signals to the contact points for creating the desired (e.g., circularly symmetric) time averaged electric field spatial distribution.

In some embodiments, the device further includes a drive circuit connected to contact points of at least one of the first and the second serpentine electrodes for selectively driving the contact points.

In some embodiments, the drive circuit provides selected phase and frequency drive signals to the contact points for creating a desired time averaged electric field spatial distribution.

In some embodiments, the serpentine electrode arrangement includes driven electrode segments in combination with a highly resistive layer connected to and filling a gap between the segments.

In some embodiments, the serpentine electrode arrangement includes driven electrode segments in combination with a transparent relatively high dielectric constant and optical index matching layer placed near the serpentine electrode arrangement and filling a gap between the segments.

In some embodiments, the substrates are flexible.

In some embodiments, the device includes a drive circuit and/or switch circuitry provided on one or more integrated circuit dies mounted within an extracellular region of the flexible substrates.

A second broad aspect is an eyeglass lens having a concave surface and the lens device as previously defined in contact with the concave surface.

A third broad aspect is a vision-improvement apparatus including: an eye-tracking device; a rechargeable power source; a polarization insensitive lens device composed of lenses as previously defined; and a driver receiving an eye-position signal from the eye-tracking device and providing a drive signal to each contact points of the serpentine electrode arrangements to cause a lens of a suitable optical power to appear on the desired position of the lens device for focussing an image onto a foveal region of the eye.

In some embodiments, the device is combined with other electrically tunable devices (e.g., a Fresnel type lens) to provide enhanced ophthalmic performance.

In some embodiments, a remotely rewritable memory element is integrated allowing the storage of "default" parameters of drive signals, these parameters being readjusted at distance when needed, e.g., in case of change of eye performances.

In some embodiments, the polarisation insensitive lens device is integrated into an "ophthalmic" glass system from one side of glasses to provide accommodative vision and aberration correction by using eye tracking system and powering and driving electronics.

In some embodiments, the polarisation insensitive lens device is integrated from both sides of glasses to provide accommodative vision, aberration correction, magnification and enhanced vision.

In some embodiments, the lens device is integrated into a virtual reality, augmented reality, or other enhanced vision systems to improve the user experience.

In some embodiments, the polarisation insensitive lens device is driven with time sequential addressing phase shifted electrical signals to create the local lens effect mainly in the desired region of the device.

A fourth broad aspect is a large angle (e.g., panoramic or fisheye or similar) vision, recording, observation or surveillance improvement apparatus including: a tracking or a motion detection capability to identify a region of interest on the scene; a polarization insensitive lens device composed of lenses as previously defined; and a driver receiving the tracking or motion detection signal and providing a drive signal to each contact points of the serpentine electrode arrangements to cause a lens of a suitable diameter, shape and suitable optical power to appear on the desired position of the lens device for focussing an image, locally improving resolution or correcting aberrations and distortion.

It will be understood that a polarization dependent or independent device to produce a dynamically adjustable free-form refractive index modulation profile over very large areas may be obtained using an electrode structure and LC cell architecture as described herein.

Similarly, a polarization independent device to produce arrays of single plane cylindrical dynamically adjustable lenses or double plane cross oriented cylindrical dynamically adjustable lenses to produce focused light lines, matrix of dots, or other desired patterns over large clear apertures, may further be obtained using an electrode structure and LC cell architecture as described herein.

BRIEF DESCRIPTION OF THE DRAWINGS

The invention will be better understood by way of the following detailed description of embodiments of the invention with reference to the appended drawings, in which:

FIG. 1*a* illustrates a schematic side view of a lens-type device known in the art, having one substrate covered by a uniform transparent ITO electrode and a second one has a hole patterned electrode (HPE), both electrodes being inside of the sandwich.

FIG. 1*b* illustrates a schematic side view of a lens-type device known in the art having a top electrode HPE layer shifted away (to the external side of the cell) to keep an optimal ratio R between the diameter of the lens CA and the separation of electrodes D by having electrodes spaced apart.

FIG. 2 illustrates a schematic side view of a lens-type device known in the art having a high resistivity or weakly conductive layer (WCL) to help further propagate the fringing field towards the center of the device.

DETAILED DESCRIPTION

Figure 3:
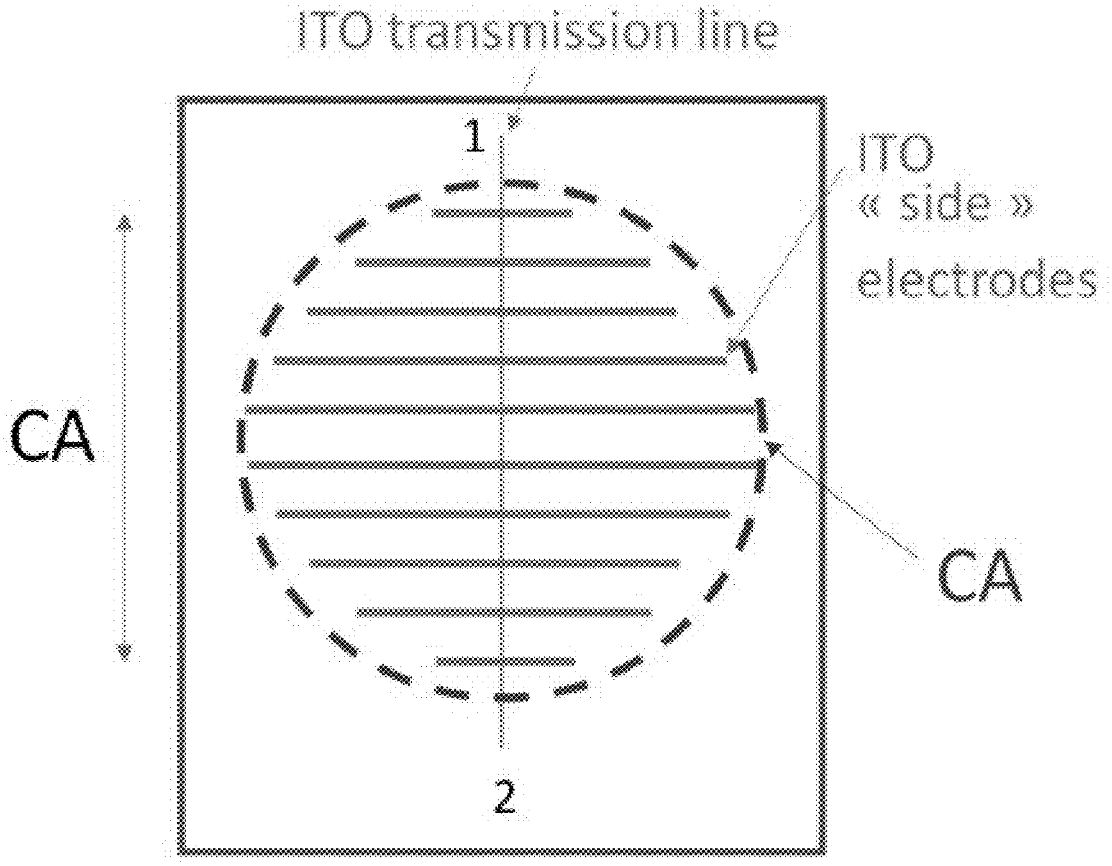
Fig. 3 (PRIOR ART)
FIG. 3 shows a schematic top view of a voltage divider trans-line LC lens known in the art having ITO transmission lines and ITO side electrodes.

FIG. 1*a* schematically demonstrates an electrically variable LC lens that is built by using a patterned electrode on the top substrate of a sandwich device containing the LC material. The second (bottom) substrate of the sandwich is typically covered by a uniform transparent electrode (e.g., indium tin oxide or ITO, zinc oxide, graphene or any other materials with similar performance). In the particular case of a circular lens, the first electrode is hole patterned electrode (HPE).

In this case, the electric field is strong in the periphery of the lens (where the HPE is facing closely the uniform ITO electrode) and is decreasing gradually when we consider positions closer to the center of the device (far from the HPE's internal limit). The reaction of the LC and the corresponding profile of the refractive index gradient will be defined by the ratio R of the clear aperture CA over the separation of electrodes D (in FIG. 1*a*, we have used D=L, where L is the thickness of the LC layer). It was shown that the desired value of R is approximately equal to 2.5.

The above-mentioned approach can be successful in a very narrow range of small CAs. However, there are several limitations in the case of larger, millimetric, ranges: to maintain good optical aberrations, the thickness L of the LC must be increased. However, larger L provides stronger light scattering and longer relaxation times. Alternatively, we could increase D, but it will increase the electrical power consumption. FIG. 1*b* demonstrate such a case, where, instead of increasing the L, the top electrode layer is shifted further (outside of the LC sandwich) to keep the ratio R optimal (for a given CA).

This is the reason why we cannot use the «fringing field» approach for relatively large CA values, e.g., in the range from 0.1 mm to 50 mm, or more specifically, in the range from 0.5 mm to 10 mm, used for imaging, ophthalmic and augmented reality applications.

Various solutions have been proposed to build devices with millimetric range of CA. One approach uses a high resistivity or weakly conductive layer (WCL) to help further propagate the fringing field towards the center of the device (Kahn, F., Electronically variable iris or stop mechanisms. 1973, US patent, Loktev, M. Y., et al., Wave front control systems based on modal LC lenses. Review of scientific instruments, 2000. 71(9): p. 3290-3297), FIG. 2. However, for millimetric size CAs, the sheet resistance value Rs for such a layer is in the Mega Ohm (per square) region and it is extremely difficult to produce uniform layers with such Rs in a reproducible way and to ensure that they are environmentally stable (since very often a non-stochiometric/incomplete oxidation of metals must be maintained to obtain such Rs values).

Given that the main challenge (for obtaining the desired profile of electric potential) is related to the design of the substrate with non-uniform (e.g., hole patterned) electrode, we shall further consider various (known and new, proposed here) versions of it (which we could call a «control substrate»), keeping in mind that, usually, we need the opposed substrate also to obtain the final device.

The fabrication of ITO layers is currently well mastered in the industry (see hereafter). Thus, several approaches were proposed to use patterned ITO (without the WCL) to obtain the required gradient of the electric field. A person skilled in the art will appreciate that while described as being an ITO electrode, other similar material may be equivalently used without departing from the teachings of this disclosure (e.g., zinc oxide, graphene, etc.).

Thus, one of them uses multiple very closely positioned discrete (up to 80) circular electrodes (Li, L., D. Bryant, and P. J. Bos, Liquid crystal lens with concentric electrodes and inter-electrode resistors. Liquid Crystals Reviews, 2014. 2(2): p. 130-154), which are controlled individually (like in LCDs or SLMs) or are partially resistively bridged. While the use of bridged electrodes reduces the number of individually controlled electrodes, this is still a very costly and complex (both for manufacturing and operation) solution.

An alternative technique of using extremely narrow ITO as a very resistive «transmission line» (and phase shifted driving technique) was suggested (J. F. Algorri, N. Bennis, V. Urruchi, P. Morawiak, L. Jaroszewicz, J. M. Sánchez-Pena, Voltage divider trans-line liquid crystal lens, PC20, 15th European Conference on Liquid Crystals, FIG. 3) to propagate the electric potential further towards the center of the device in the desired way (by distributing different values of the electrical potential from the center to the periphery). However, if the resistance of the transmission line is not high enough, the only way to create a spatial profile of electric field will be the "forced" or phase shifted control. In contrast, to obtain a "natural" decrease of the potential (e.g., when one of the contacts is powered, while the second one is floating) for millimetric range devices, the width of a standard ITO «transmission line» (with a Rs value between 50 to 100 Ohm/square) must be sub micrometric, which is extremely difficult to obtain in a reproducible way at the industrial scale. Thus, even for a 0.5 micrometer width of the ITO transmission line, the drop of potential over 10 mm is less than 12%. Thus, the electric potential's modulation depth is very poor.

Another approach of a spiral shaped ITO electrode was proposed (in U.S. Pat. No. 8,421,990 B2), which seems to be simpler to produce and to control. Indeed, if the parameters of the system are well designed, only one electric signal (with respect to the ground) is needed here to create and to control the lens. The electric potential is applied to the external electric contact 1, while the central end of the ITO is let floating. The opposed substrate bears a uniform transparent electrode that can be grounded.

However, in this approach, to propagate (with gradual decrease) the electric potential to millimetric scales (with typical LC materials, thicknesses of at the order of 50 micrometers), the width w of the ITO lane and the gap g between neighboring ITO lanes must be chosen in a way that the pitch of the ITO pattern (w+g) becomes comparable with the thickness of the LC layer L. In this case, the LC material's reaction will be abrupt (step wise between the zones with and without ITO) since the corresponding fringing field will not be able to «smoothen» the electric field between ITO lanes. This will create light scattering and degradation of its wavefront.

To resolve the above-mentioned problem of wavefront degradation, we propose the use of a relatively high dielectric constant layer (HDCL), including the real, imaginary or both components. The proposed HDCL must be cast near the ITO pattern (e.g., cast under or above the patterned ITO layer). Its dielectric constant ε may preferably be in the range of ε=20 or above to be used for the range of CAs we are interested in. As a reference, air has ε=1 and most polymers and glass materials have e in the range of 4 to 6. Additionally, in order to reduce any optical impact of the HDCL on the LC device, the HDCL may have its optical index matched with the optical index of the ITO.

Experimental verification demonstrates that the proposed HDCL indeed smoothens the electric potential's profile and makes the light wavefront acceptable for imaging applications. In contrast to the WCL, there are many industrially well-mastered optical materials with high ε (see, e.g., J. Robertson, High dielectric constant oxides, Eur. Phys. J. Appl. Phys. 28, 265-291 (2004)). Thus, other solid material candidates (for the HDCL) may be other metal oxides, such as Hafnium Oxide ($HfO_2$), $Ta_2O_5$, $ZrO_2$, etc. The case of $HfO_2$ is particularly interesting and useful since, in addition of having $\varepsilon=20$, it also has a refractive index that is very close to the refractive index of ITO. This may enable the fabrication of index matched layers that would minimize Fresnel reflections from the combined layer of the ITO and HDCL (since the ITO layer will be optically "hidden").

We can also find some photopolymerizable (reactive) LC materials which have high ε (often they are anisotropic, so $\varepsilon_{//}$ and $\varepsilon_{\perp}$ are different and their difference $\Delta\varepsilon \equiv \varepsilon_{//}-\Sigma_{\perp}$ can be rather high, well above 10).

Thus, in a first embodiment, to obtain millimetric scale devices with gradually changing electric field we propose to use a HDCL in the close proximity to the pattern of the ITO electrodes (under or above).

In a different embodiment, the substrate, that is bearing the ITO spiral, can itself be a material with high value of ε.

In a different embodiment, the LC materials can itself be a material with high value of ε.

In a different embodiment, the HDCL material can be a combination of layers.

Figure 4A:
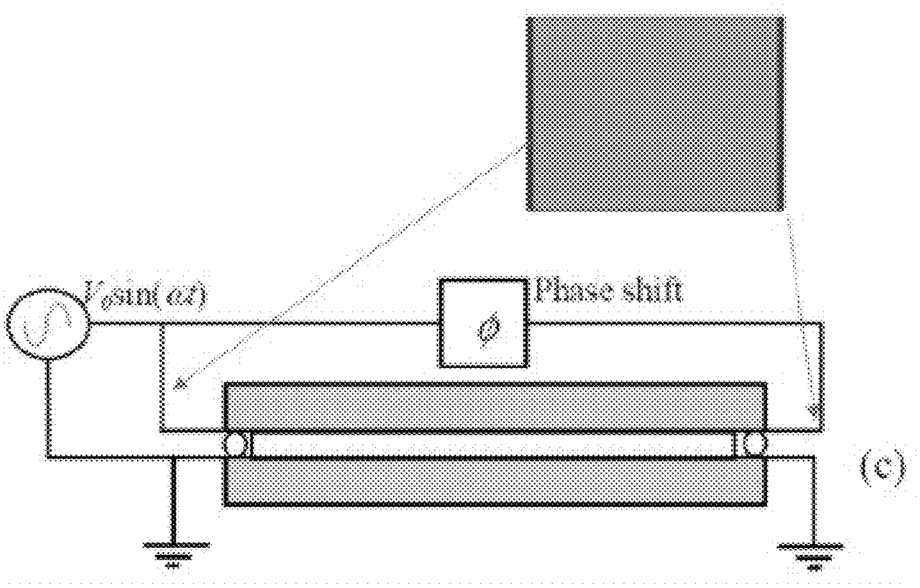
Fig. 4a (PRIOR ART)
FIG. 4*a* illustrates a schematic side view of a cylindrical lens-type device known in the art, having a phase shifted drive (PSD) wherein the bottom substrate is grounded, and the top substrate has two contacts at the opposed corners and the voltages provided are phase shifted at φ.
Figure 4B:
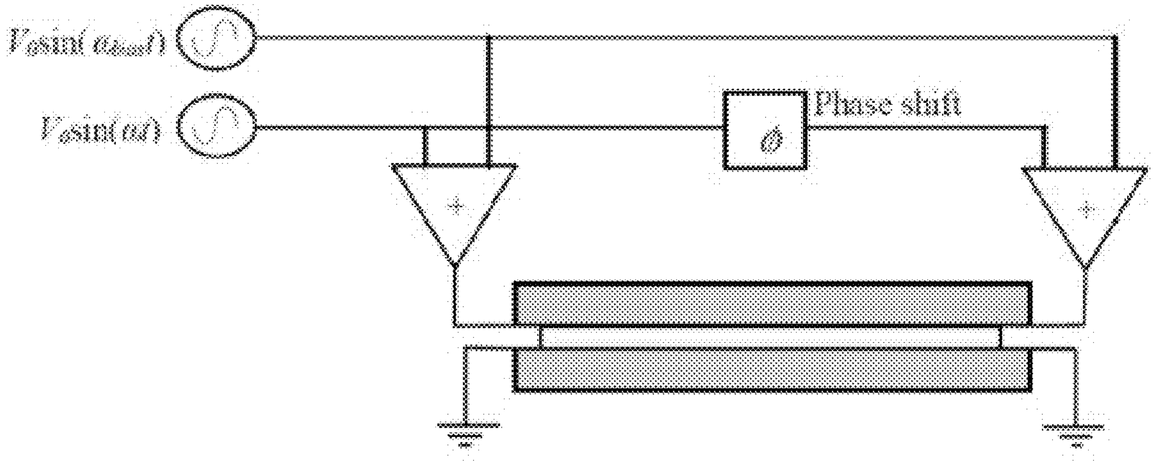
Fig. 4b (PRIOR ART)
FIG. 4*b* illustrates a schematic side view of a cylindrical lens-type device known in the art, having a PSD wherein the bottom substrate is grounded and the top substrate has two contacts at the opposed corners and the voltages provided have adjustable phase shift (φ) and bias voltage.

A different approach that was developed is the use of various PSD driving techniques, including the case, when, for example, the high voltage is provided to one contact ($U_1$), while the second one is ground (and $U_2$–0). The voltage distribution will be different (and thus the properties of the lens will be different) if that second contact is kept «floating» (not ground). Even more interesting here is the case, when we apply different voltages (say, $U_1$ and $U_2$) with different phases, $\Phi_1$ and $\Phi_2$. Such a PSD approach has been already demonstrated to obtain lensing effect (Andrew K. Kirby, Philip J. W. Hands, and Gordon D. Love, Liquid crystal multi-mode lenses and axicons based on electronic phase shift control, 17 Oct. 2007/Vol. 15, No. 21/OPTICS EXPRESS 13496). In that demonstration, two substrates are bearing uniform ITO layers. FIG. 4*a* represents the operation principle in its simplest demonstration, for the case of a cylindrical lens. The bottom substrate here is grounded. The top substrate has two contacts at the opposed corners and the voltages (here sinusoidal), applied to those corners, are phase shifted at φ. This phase shift (e.g., for)$\varphi=180°$, generates a drop of the electrical potential from the periphery of the device (U=6.3V) to the center of the device (U=0V), generating thus a corresponding molecular reorientation pattern. Various modifications of this device are possible, including the change of φ and/or adding a bias voltage FIG. 4*b,*

Figure 5A:
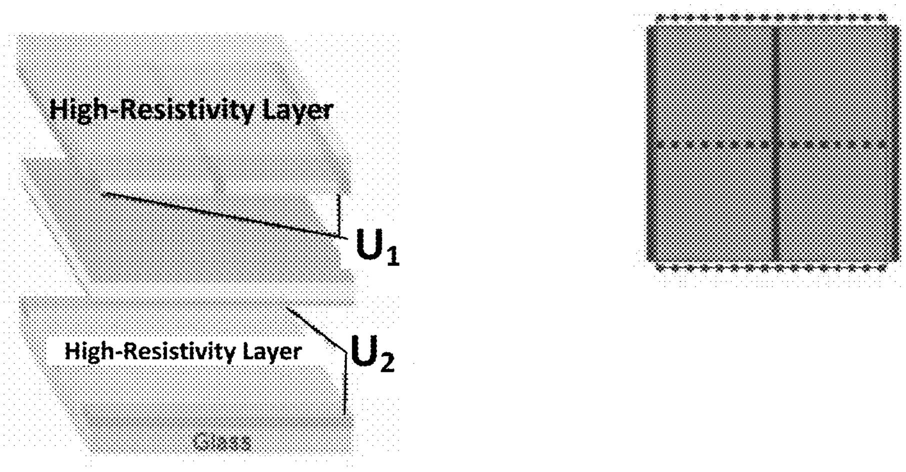
Fig. 5a (PRIOR ART)
FIG. 5*a* illustrates an exploded view of an array of 2×2 lenses as known in the art, wherein the PSD is implemented by using parallel linear (finger like) electrodes and high resistivity or WCL layer.
Figure 5B:
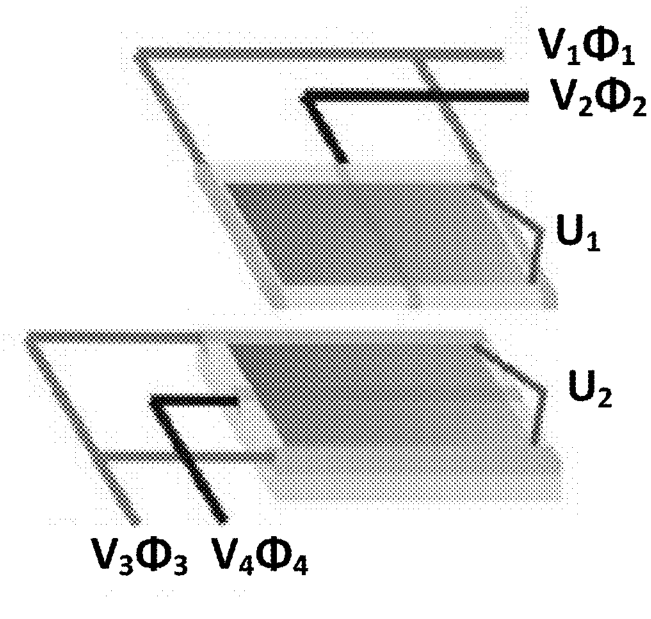
Fig. 5b (PRIOR ART)
FIG. 5*b* illustrates an exploded view of the array of 2×2 lenses shown in FIG. 5A wherein two electrodes at each extreme corner are shorted and driven with the same voltage and phase.

In another article (J. F. Algorri, G. D. Love, and V. Urruchi, Modal liquid crystal array of optical elements, 21 Oct. 2013|Vol. 21, No. 21|DOI: 10.1364/OE.21.024809|OPTICS EXPRESS 24809), authors describe a further application of the PSD by using parallel linear (finger like) electrodes and high resistivity or WCL layer (FIG. 5*a*) to generate arrays of 4 (or 2×2) lenses. In this case, each substrate is bearing 3 ITO (parallel linear) electrodes, but, to construct the cell, the second substrate (with a similar electrode structure) is rotated by 90°. For this purpose, two electrodes at each extreme corner are shorted (FIG. 5*b*) and driven with the same voltage and phase ($V_1$ and $\Phi_1$ at the top substrate and $V_3$ and $\Phi_3$ at the bottom substrate), but the middle electrodes are driven independently with specific voltages and phases ($V_2$ and $\Phi_2$ at the top substrate and $V_4$ and $\Phi_4$ at the bottom substrate). The device allows the simultaneous generation of 4 (or 2×2) lenses, that can be controlled by the voltages and relative phase shifts between those electrodes.

Figure 5C:
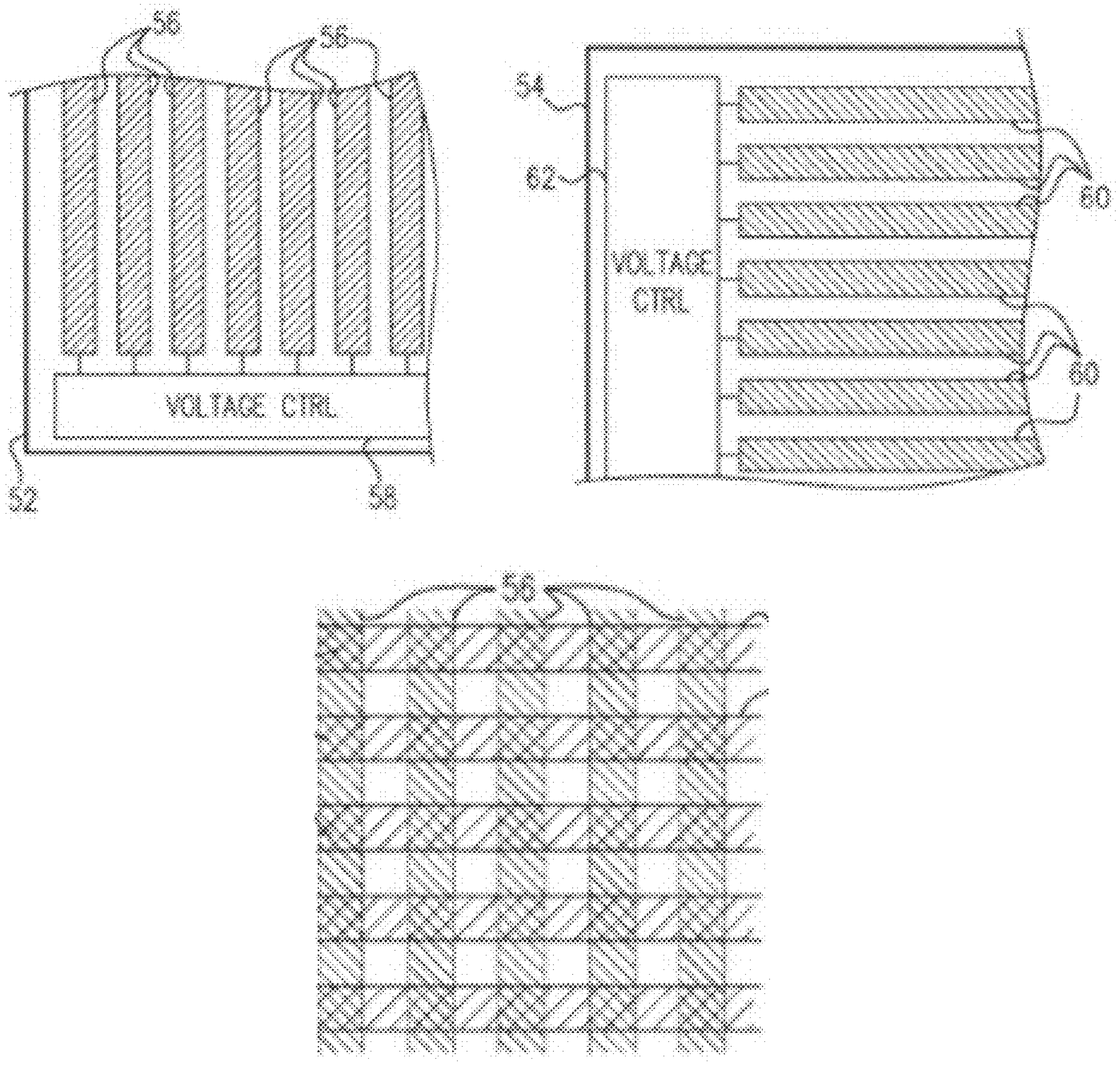
Fig. 5c (PRIOR ART)
FIG. 5*c* is a composite illustration of an array of individually controlled independent linear electrodes stripes arranged in orthogonal directions on opposed substrates.

Now referring to FIG. 5*c* which is a composite illustration of an array of individually controlled linear electrodes stripes arranged in orthogonal directions on opposed substrates as known in the prior art. This embodiment uses a similar architecture of prior art solutions (typical of LCDs and SLMs) as presented in FIGS. 5*a* and 5*b* and illustrates an electrode structure having any number of linear electrodes stripes. In this embodiment, each electrode structure is orthogonally positioned on both substrates of an LC cell. The meshing this creates may therefore allow the selection of any combination of electrodes from each substrate, such as to create the desired lens over the desired location (i.e. which may be centered around the middle of the driven electrodes or at any location depending on the driving signals provided to all electrodes). In this prior art solution, the driving of the electrodes may become a significant issue when the structure includes a great number of electrodes for large CAs. This is because the electric potential is not propagated here in the transverse plane and, to shape it adequately, e.g., at the scale of CA=5 mm, at least 100 (top substrate)+100 (bottom substrate)=200 closely spaced electrodes (with a pitch of 0.05 mm) must be actively controlled to produce an LC lens device covering the 5 mm area (the typical size of a typical ophthalmic glasses lens may be 50 mm).

While a single layer of LC between substrates having orthogonally-arranged serpentine electrode arrangements can be controlled to form a GRIN lens having circular lens properties for a given linear polarization of light, it will be appreciated that by adding a second layer of LC in an orthogonal polarization in combination with the first layer can provide a device that acts on natural, mixed polarization of light. Similarly, a single layer of LC between substrates having a serpentine electrode arrangement on one substrate and a uniform electrode on the opposed substrate can provide a GRIN lens having cylindrical lens properties for a given linear polarization of light. Two such layers of LC can provide orthogonal cylindrical lenses, if desired, the combination of which can provide a GRIN lens having circular lens properties. Doubling the number layers, in this case, can also provide a device that acts on natural, mixed polarization of light.

In contrast, it may be possible to significantly reduce the number of required electrodes and consequently the complexity of the solution when the electric potential is propagated in the transverse plane without using a great number of electrodes. One way of doing it is the use of WCLs. Due to its "semiconductor" properties, very limited number of actively controlled electrodes (below the total of 4 electrodes) may be required to produce the same lensing effect over the same CA=5 mm. Such significant gain (200/4=50 times) may make this lens as a practical solution.

However, there are several problems here, the most important being the industrial (large scale) fabrication of the WCL which is not obvious. Let us remind that the role of the WCL is to "propagate" and to "re-shape" the electrical potential distribution in the transversal plane. In what we shall propose next, this function can be performed without the use of a WCL.

Figure 6A:
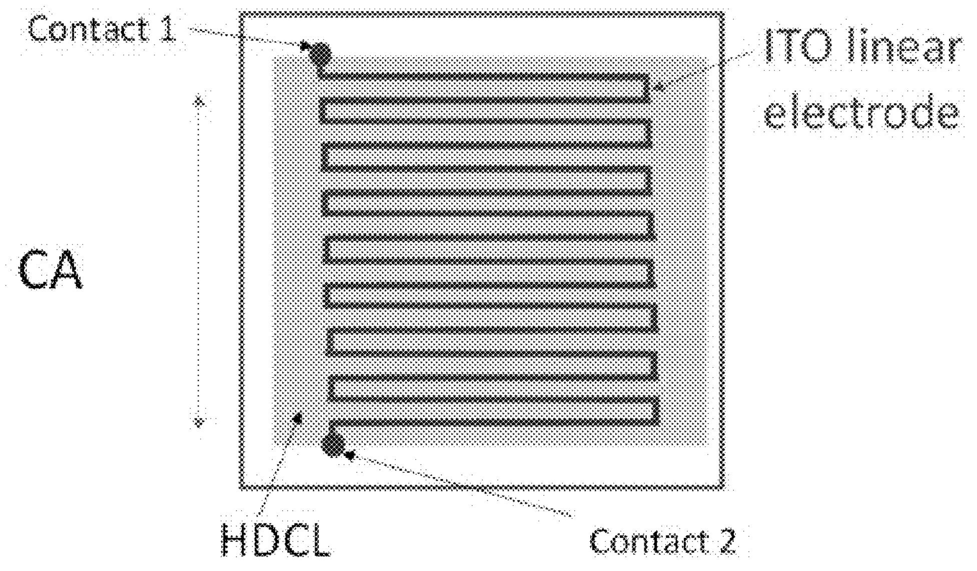
FIG. 6*a* illustrates a schematic top view of a substrate having a single (all connected) linear or serpentine-shaped electrode stripes or lanes with an optional HDCL in accordance to an embodiment of the present disclosure.
Figure 6B:
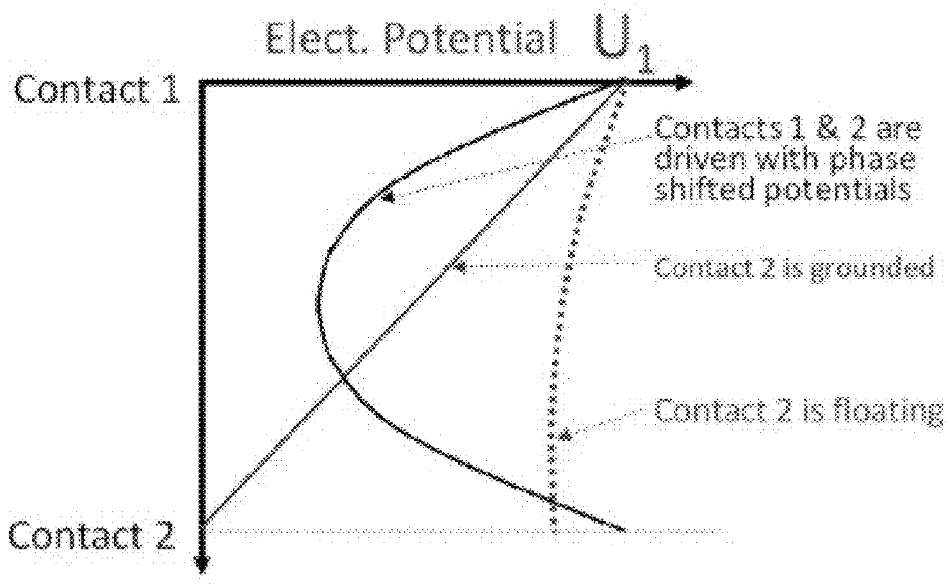
FIG. 6*b* illustrates a diagram schematically showing the changes of electrode potential (U1) for two contacts (shown in FIG. 6*a*) when they are both actively driven (in this example the phase-shift between them is zero), one of them (No. 2) is grounded or is floating.

In some embodiments, the proposed here ITO electrode may be a linear-shaped electrode stripes or lanes (FIG. 6*a*) to generate electrically tunable prism or cylindrical lens functions. In the simplest example, this substrate could face a uniform ITO electrode on the opposed substrate. Thus, the application of the high electric potential $U_1$ to the contact 1 (while the uniform electrode is ground) will generate stronger LC reorientation on the upper part of the device, since this potential will decrease with different gradients (towards the electric contact 2, see FIG. 6*b*) depending upon the fact if the contact 2 is grounded $U_2=0$ (this may generate a rapid drop of potential) or if it is left floating $U_F$ (this may generate a slower decrease of the electric potential. Such a substrate, combined with the opposed substrate with uniform grounded ITO (to form a sandwich with the LC) will enable the generation of a transversal gradient of the refractive index and a corresponding tilt (steering) of light, e.g., in the direction towards the contact 2 if the NLC has positive anisotropy. The situation may be inversed if the potential is applied to the second contact (bottom).

We can also generate a symmetrical electric potential profile (FIG. 6*b*) if these two contacts are driven with specific potentials ($U_1$ and $U_2$) with specific phases ($\Phi_1$ and $\Phi_2$). Thus, if the phase shift is zero (or both contacts, 1 and 2, are maintained at the same potential) and the parameters of the structure (LC, resistance of the ITO, width w of ITO lanes, the gap g between ITO lanes, etc.) are chosen in an appropriate way, then the drop of the potential towards the center of the structure (between contacts 1 and 2) will be symmetric. This type of structure may generate a tunable cylindrical lens. This is also a particularly interesting case since this type of substrate, combined with another similar substrate (instead of the uniform ITO) can form a sandwich (the second substrate being rotated at 90 degrees, see hereafter) and can be used as a tunable device (lens, prism, etc.) even without the use of an HDCL while being driven with PSD.

Here also, many variations of PSD are possible in terms of voltages and phases applied to both contacts.

Figure 9A:
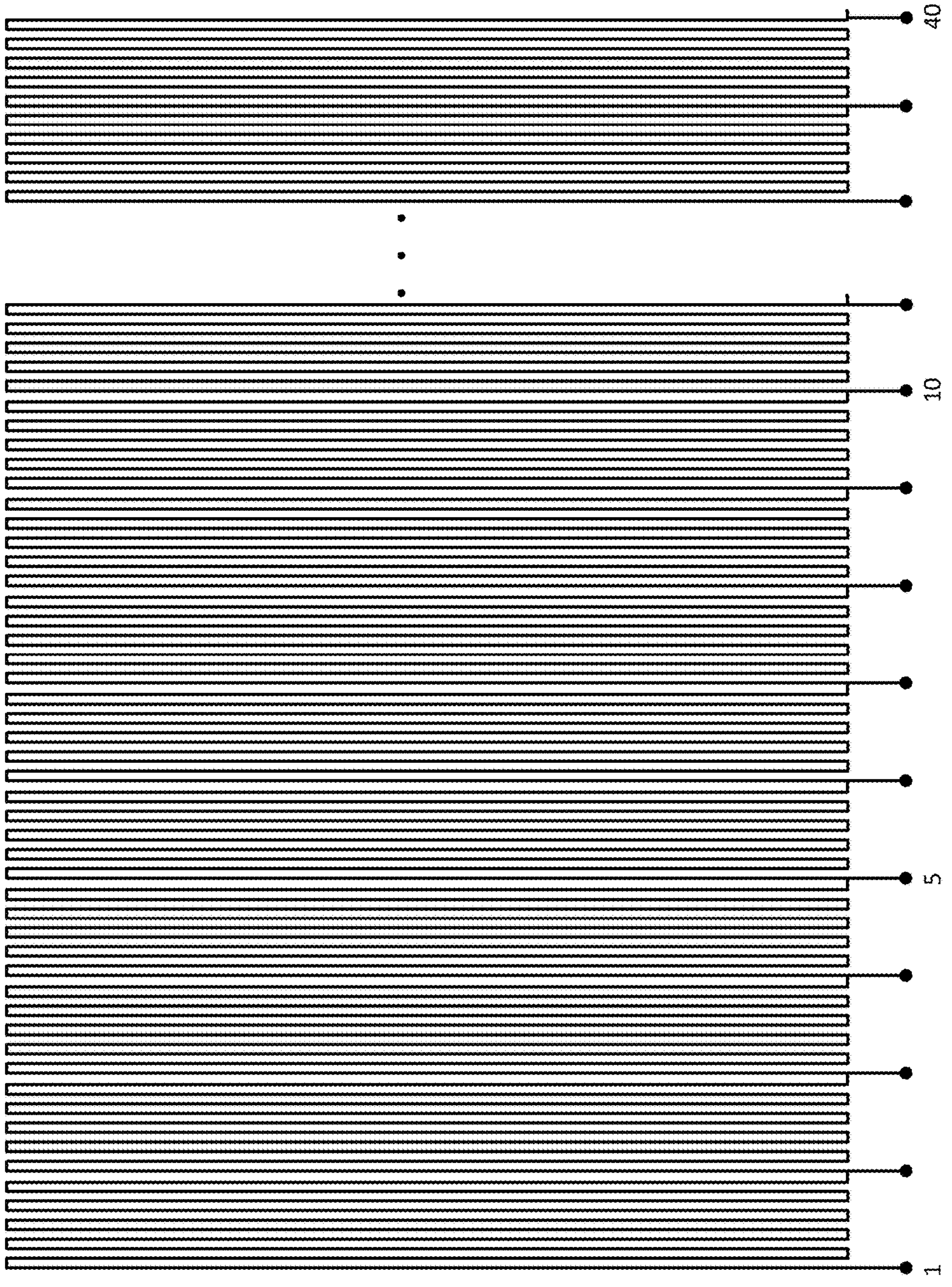
FIG. 9*a* illustrates a schematic of a serpentine electrode from a first substrate of an LC cell allowing the generation of a lens with different apertures (diameters) and positions (centers) having two similar substrates as shown in FIG. 7*b*, but with multiple electrode contacts (juxtaposition of multiple similar patterns) in accordance with one embodiment of the present invention.
Figure 9B:
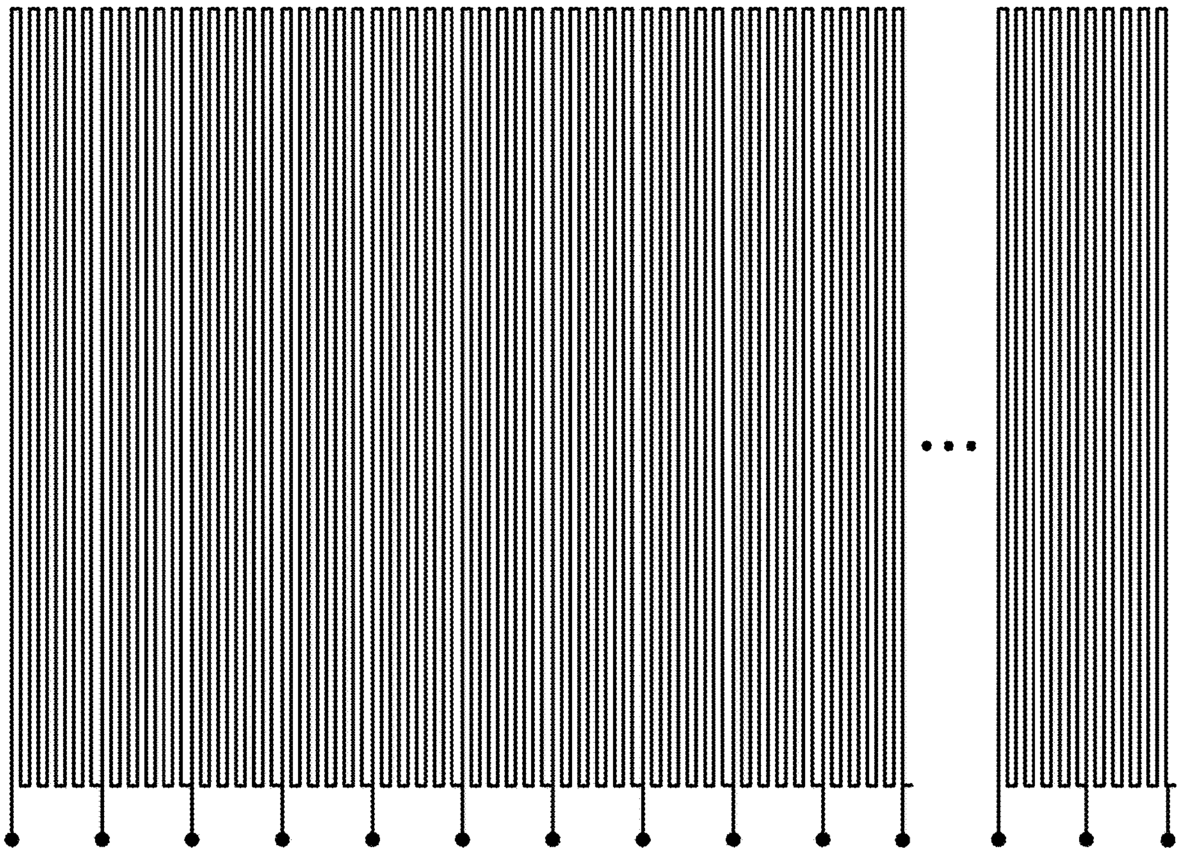
FIG. 9*b* illustrates a schematic of a serpentine electrode from a second substrate of an LC cell allowing the generation of a lens with different apertures and positions having two similar substrates as shown in FIG. 7*a*, but with multiple electrode contacts (juxtaposition of multiple similar patterns) in accordance with one embodiment of the present invention.
Figure 9C:
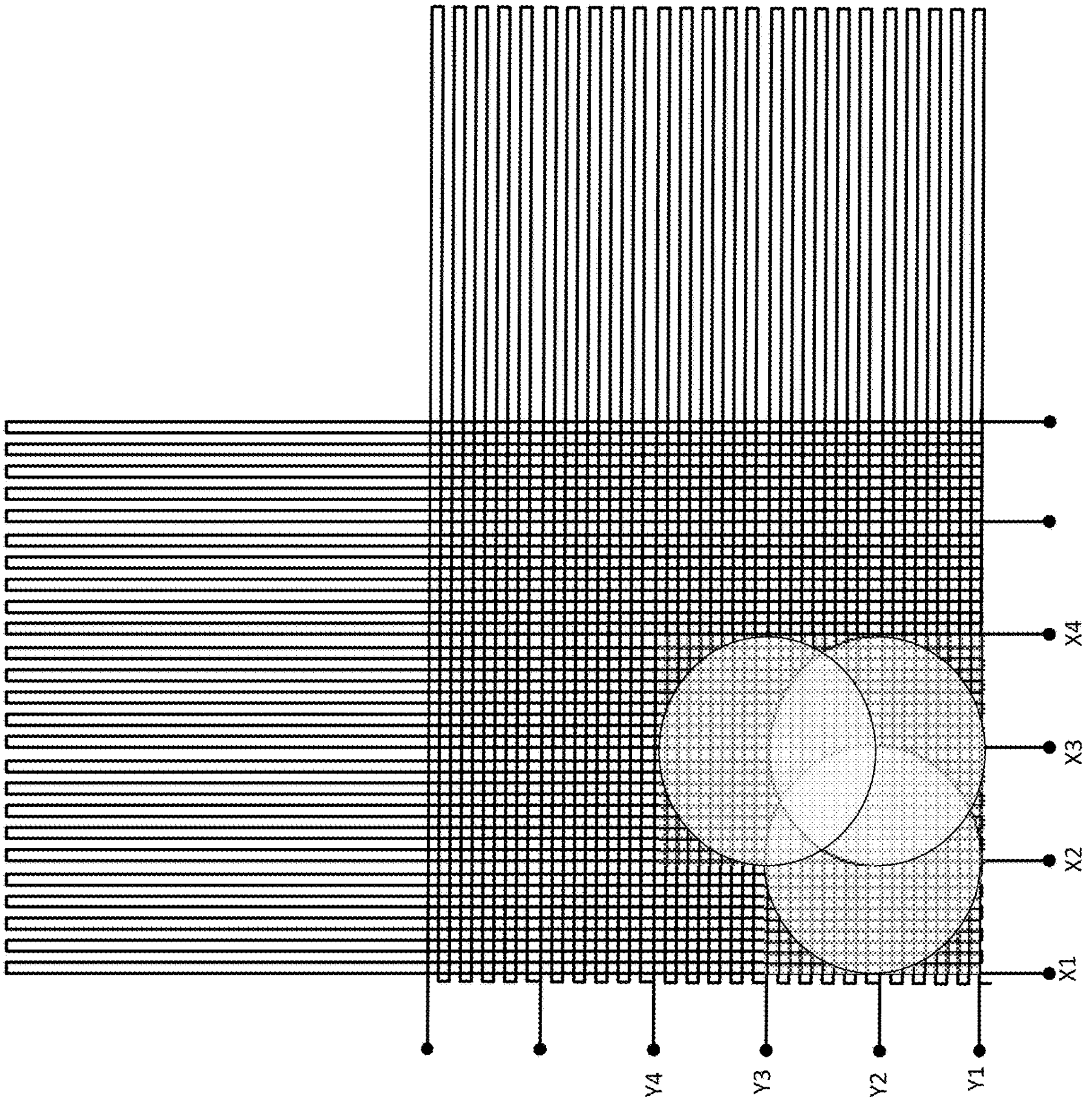
FIG. 9*c* illustrates a schematic of the orthogonally oriented serpentine electrode structures from both substrates of an LC cell allowing the generation of a lens with different apertures and positions in accordance with an embodiment of the present disclosure.

In a different embodiment, the width w of the ITO lanes or their pitch (lane separation g) or both of those parameters (w and g) may be spatially varied (chirped) in a linear or non-linear way to additionally shape the electric field across the transvers plane of the device (in all previous and following electrode designs, see e.g. FIGS. 9*a* to 9*c*). If needed, the value of ε of the HDCL may be further optimized for these varying patterns of ITO. The dielectric parameters of the LC as well as its thickness must also be taken into account in this optimization.

Figure 7A:
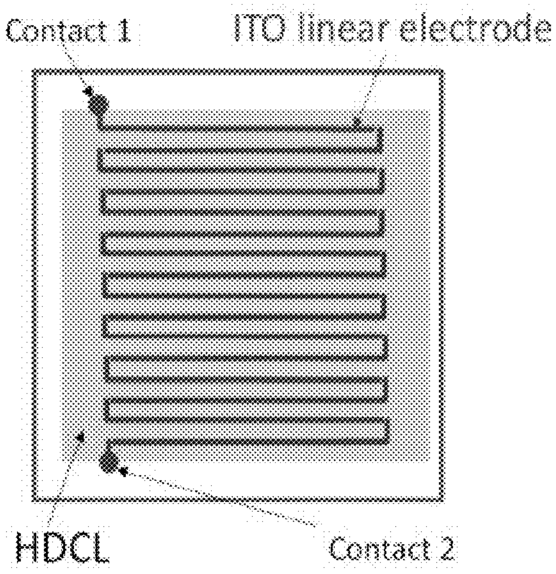
FIG. 7*a* illustrates a schematic top view of a top substrate, having an optional HDCL and contact 1 and contact 2, used in an LC cell along with another substrate containing a similar or uniform electrode enabling both steering and focusing functions in accordance with an embodiment of the present disclosure, wherein contact 1 and contact 2 are separated at the top.
Figure 7B:
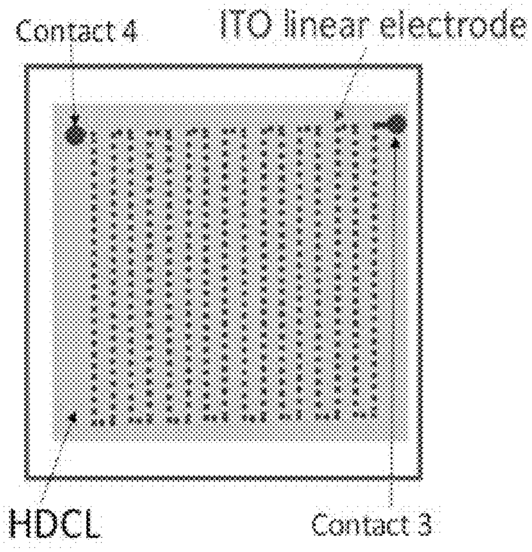
FIG. 7*b* illustrates a schematic top view of a bottom substrate, having an optional HDCL and contact 3 and contact 4, which can be combined with the top substrate to form an LC cell that can perform both steering and focusing functions in accordance (with an appropriate PSD) with an embodiment of the present disclosure, wherein contact 3 and contact 4 are separated at the bottom.
Figure 7C:
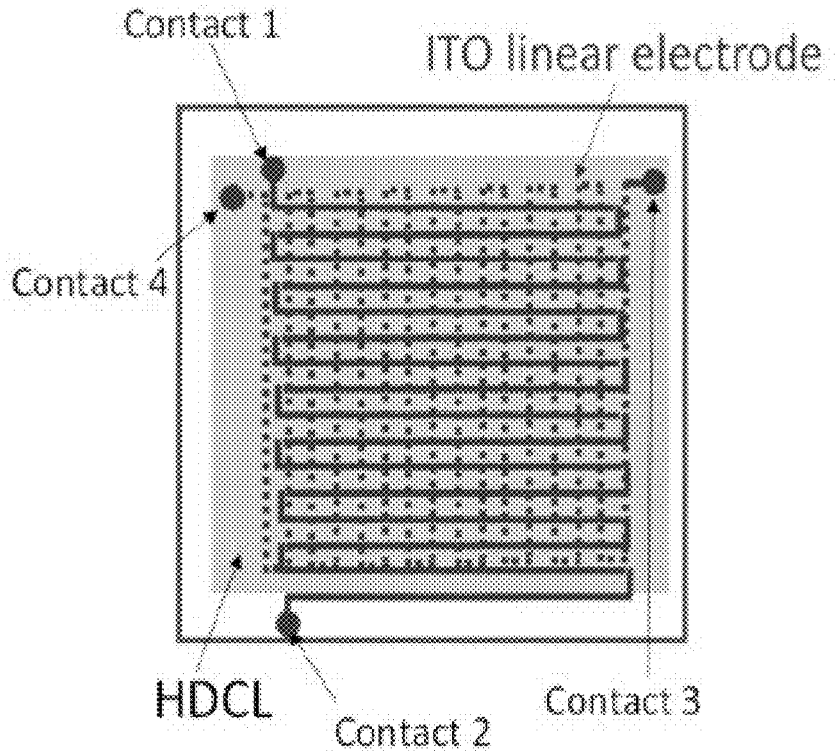
FIG. 7*c* illustrates a schematic top view of an LC cell that can perform both steering and focusing functions (with an appropriate PSD) in accordance with an embodiment of the present disclosure, wherein two substrates, shown in FIGS. 7*a* and 7*b*, are assembled together with corresponding contacts 1 to 4.

In a different embodiment, as already mentioned above, the combination of two similar substrates (with or without the HDCL) can be used to build an LC cell (or sandwich) that can perform both steering and focusing functions. FIGS. 7*a* to 7*c* demonstrates separately the top (FIG. 7*a*), bottom (FIG. 7*b*) and assembled together (FIG. 7*c*) substrates with corresponding electrodes and 4 electric contacts (two by substrate). The use of the HDCL may further not be required with this architecture. As mentioned already, such a lens can cover the 5 mm diameter by using only 4 electrodes (versus the 200 electrodes, used in SLM or LCD approaches).

Figure 8A:
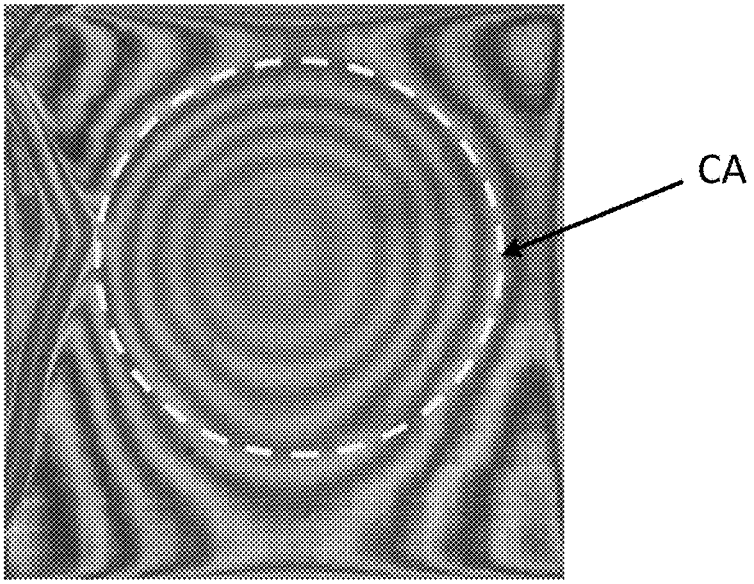
FIG. 8*a* illustrates an example of experimentally observed distribution of the output light's wave front (bright and dark rings, corresponding to multiples of π phase shifts on the transmitted light wavefront, are observed by inserting the LC cell between cross oriented polarizers), obtained with the proposed cell design presented in FIG. 7*c*, but without HDCL.

An example of experimental results, obtained with the proposed cell design FIG. 7*c* (with the top substrate presented in FIG. 7*a*, and with an opposite substrate presented in FIG. 7*b*, without the use of HDCL in both cases) is shown in the FIG. 8*a*. To obtain this figure, the cell was fabricated with its ground state director oriented by the diagonal (with respect to serpentine orientations of top and bottom substrates) and was placed between cross oriented polarizer and analyzer, and the ground state orientation of LC's director was also aligned at 45 degree along the polarizer and analyzed directions. The bright and dark rings represent, respectively, 2π and π phase shifts (between ordinary and extraordinary polarization modes) on the wavefront of light traversing the cell.

The clear aperture (CA) diameter of the lens is approximately 0.5 mm and the thickness of the liquid crystal is 40 micrometers (the optical birefringence of the used nematic LC or NLC is ≈0.2). The ground state orientation of the NLC here is by diagonal (at 45 degrees with respect to electrode lines, it can be chosen to be different also). The typical voltage, applied on electrodes may be at the order of or below $10V_{RMS}$ and the typical frequency is 0.5 kHz. The relative phases of 4 signals are 0, 90°, 180° and 270°. This picture shows that the wavefront of light is now curved and light is focused (the dashed white circle shows the useful part of the CA). By changing the control parameters (voltage, frequency, phase shifts, etc.) we can change the focusing distance and aberrations of the lens.

Figure 8B:
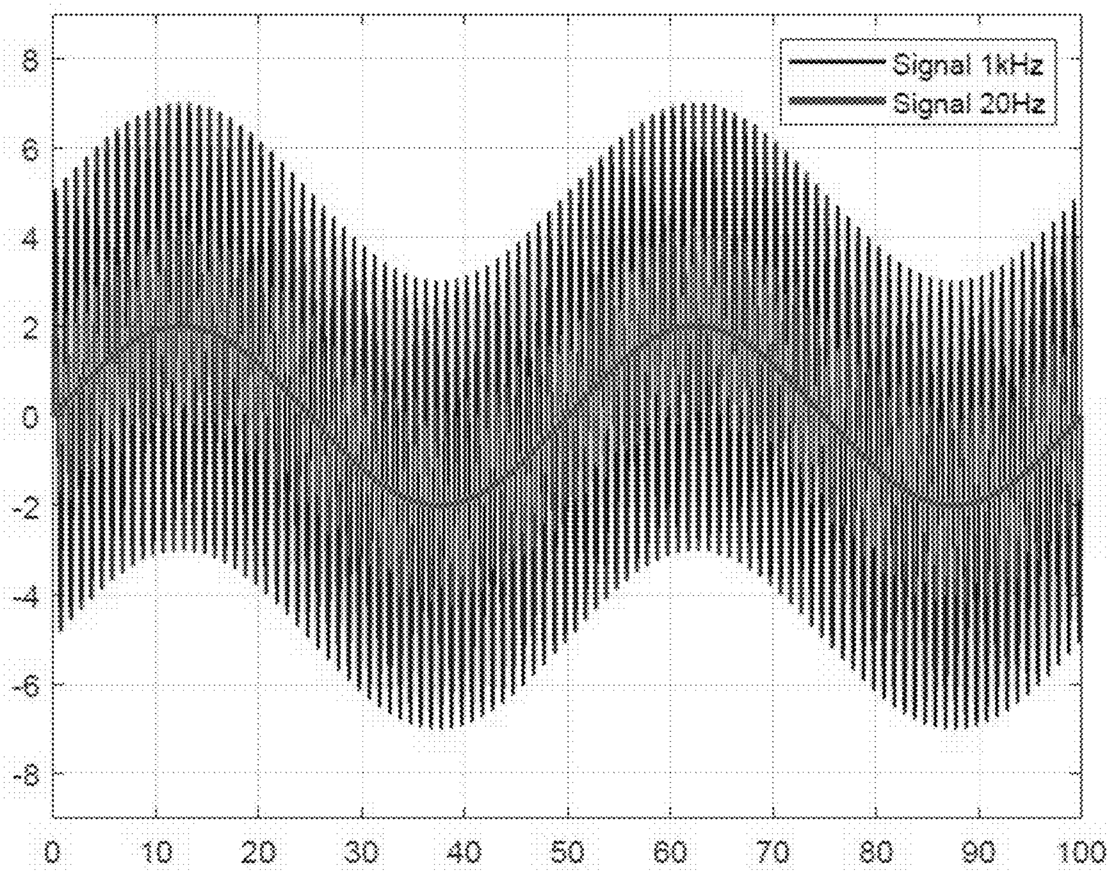
FIG. 8*b* is a schematic plot of voltage as a function of time for control signals (high frequency main signal and low frequency offset signal) applied to electrodes on opposed substrates.

To improve the performance of the lens, we may offset the potential of one substrate with respect to the second substrate. This may be done by using a combination of electrical signals, for example, by using one high frequency and one low frequency signals as illustrated in FIG. 8*b*, on one of couples of electrodes (cast on the same substrate) with respect to other couple of electrodes (cast on the opposed surface). FIG. 8*b* shows an example of sine waveform, but it can be also square shaped since the LC reacts mostly to the RMS field.

In still another different embodiment, two similar substrates with however multiple electrode "external" contacts (FIG. 9), each segment (between these contacts) being similar to those described in FIG. 7 (with or without HDCL), can be used to build an LC cell allowing the generation of a dynamic lens with different apertures, optical powers and positions. Namely, we can use a first serpentine electrode on a first substrate (FIG. 9*a*), on which we have multiple segments connected to the driver (for example, the serpentine electrode may have 40 contact points). Each of these external contacts may be powered (with different voltages in different phases), put to ground or let as floating. Another similar electrode on a second substrate, but with electrodes aligned in the perpendicular direction (FIG. 9*b*) may be also fabricated and used as part of the LC device. We can then position them together at a specific distance to build the LC cell sandwich (FIG. 9*c*).

In the simplest version of the embodiment, each substrate contains only one serpentine (all connected) electrode. The number of required external contact electrodes may be defined by the total size of the device as well as by the spatial (transversal) "resolution" for the choice of the center of the desired lens (see hereafter). In some other embodiments, the number of contacts per serpentine electrodes may be 50 or up to 100 to cover very large surfaces (e.g., 50 mm). A person skilled in the art will appreciate that any number of contact points for the serpentine electrodes may be used without departing from the teachings of this disclosure. However, increasing the number of contacts necessarily increases the challenge of connecting the electrode drivers and ensuring driving signals are provided to the correct contacts. In addition, while illustrated as a single continuous serpentine electrode in FIGS. 9*a* and 9*b*, a person skilled in the art will appreciate that the electrode structure on an LC cell substrate may include any number of separate serpentine electrodes (each having any number of contacts), such as to create zones, segments or regions, over the LC substrate (for example, an ophthalmic glass LC device may have more than one lensing region, each region comprising its own separate electrode structure).

We can then apply continuous sequence of signals or standard LCD time multiplexed signals to various electrode groups as described herein. For example, using the serpentine electrode as presented in FIG. 9*c*, the electrodes X1&X3 and Y1&Y3 may be activated (driven), and thus create a lens with a clear aperture centered at coordinates X2-Y2 (bottom left lens in FIG. 9*c*). As already mentioned, in its simplest implementation, all other contacts may be left floating and thus just 4 activated electrodes may be enough to create a lens of 5 mm diameter. In contrast, if specific excitations may be applied to any desired electrode, while others may be grounded or left floating, and therefore create any desired lens (centered at the desired location and with the desired width) over the entire meshing of serpentine electrodes. The additional activation of control electrodes may be done both inside the created lens area as well as outside. Obviously, we can move the center at desire by using the right contacts and right excitation signals, and, once established the new position of the center of the lens we can also change its diameter or chose the diameter and change its optical power or aberrations dynamically.

In the example, described above (in FIG. 9*c*), the remaining area (out of the "dynamic lens" zone) may appear non uniform or distorted if we do not care about it. However, it may affect the peripheral vision of the customer or affect the quality of the recording if such a lens is used, e.g., in a panoramic (or fish-eye) camera. In this case, we can also apply electrical signals to remaining electrodes to further control or to homogenize the LC's orientation in those zones too. For example, if the desired "dynamic" lens is created in the top left corner, then the remaining electrodes may be activated by other electric signals to also reorient molecules, but in a flat manner (uniform), not lens-like.

In some embodiments, the serpentine electrode structure as illustrated in FIG. 9*c* may be used in a foveal LC lens device. As is known in the art, LC lenses have an optical power that is proportional to the thickness of the LC material and inversely proportional to the square of the aperture. A suitable LC lens therefore generally cannot be much wider than about 5 mm. This aperture size may be approximately suitable for focussing the part of the whole field of view seen by the fovea of the eye, but not the whole field of view. Using an LC device with the electrode structure as presented in FIG. 9*c*, a small "foveal" lens may be created at a desired location within the field of view by providing selected voltages to selected electrodes of the electrode mesh.

In the embodiment of FIG. 9*c*, the LC lens device may allow the generation of relatively smooth refractive index profiles by using a minimum number of electrodes in contrast to alternative approaches such as SLMs or LCDs, see e.g. prior art illustrated at FIG. 5*c*.

While a lens may be created by the activation of only four contact electrodes at a time, with other contacts left as floating, it will be appreciated that more electrodes may be activated at a time (both inside the local lens zone as well as outside that zone) to refine the profile and to have better control over the generated profile. Given that SLMs or LCDs require very tight (close) positioning of control electrodes being actively controlled, the present LC device may still have much less control electrodes even if all electrode contacts would be activated to generate a lens (due to the serpentine design allowing the "spread" of the electric potential in space). For example, the typical pitch of SLMs may be below 0.05 mm while the typical pitch of the control electrodes of the present LC device may be at least 10 times larger. Therefore, to cover the same areas, an LC device with the serpentine electrode structure of FIG. 9*c* may have significantly less control electrodes compared to SLMs. As such, the present LC device may provide significant benefits over the prior art by reducing the complexity of the design, the connection numbers, the driving modules, etc.

In the example of a 2 mm diameter LC foveal lens, electrodes having a different control signal may be required every 0.10 mm or less. This effectively results in an electrode width of less than about 0.05 mm, such as to allow for spacing between the electrodes. Thus, at least a total of 40 separate control signals (e.g., 20 signals delivered to each substrate) may be required to drive a foveal lens having a design as known in the art, such as the one illustrated at FIG. 5*c*. In a 3 cm eyeglass lens, this may result in a total of about 600 electrode connection nodes and a switch matrix to controllably connect each electrode nodes to one of 40 signal sources. In such configuration, the manufacturing and controllability of such device may be too complex to be useable. Additionally, the control systems and connections may require significant real estate in a glasses frame or other device, such that it may be too cumbersome to be used in a practical application.

However, using the proposed here serpentine electrode structure for the foveal LC lens device, such that 4 or 6 electrode contact points are driven by a signal to form a foveal lens in an electrode matrix (which may include a total of about 60 or 80 connection nodes, each spaced at around 1 mm instead of each 0.1 mm) with an electric field spatial modulation controller may be significantly superior.

For example, referring to FIG. 9*c*, when electrodes X3 and Y3 are connected to ground or left floating, while X2, X4, Y4, Y2 are connected to different phase signals, the top lens may be formed in the LC layer. By selecting different sets of 6 electrodes, the position of the LC lens may be changed in the LC layer, by a minimum of increments representing the spacing between contacts of the serpentine electrode, such as increments of 1 mm in the example given. As illustrated, there may be about 10 turns of the serpentine electrode between each connection node (depending upon ρ, w, g and LC properties), and the difference in voltage and/or phase between two nodes may cause the desired voltage drop between them that is spread out over the serpentine network. This drop will lead to a 3D shaped electric field profile in the x-direction and in the y-direction respectively that may be as shown in FIG. 9*h*.

Other additional electrodes can be activated, e.g., to shape the electric potential's profile outside of the lens described above.

By the choice of appropriate signals (voltages and phases), various wave forms may be obtained to focus, to correct aberrations, to steer light or even create a negative (defocusing) lens.

Figure 9D:
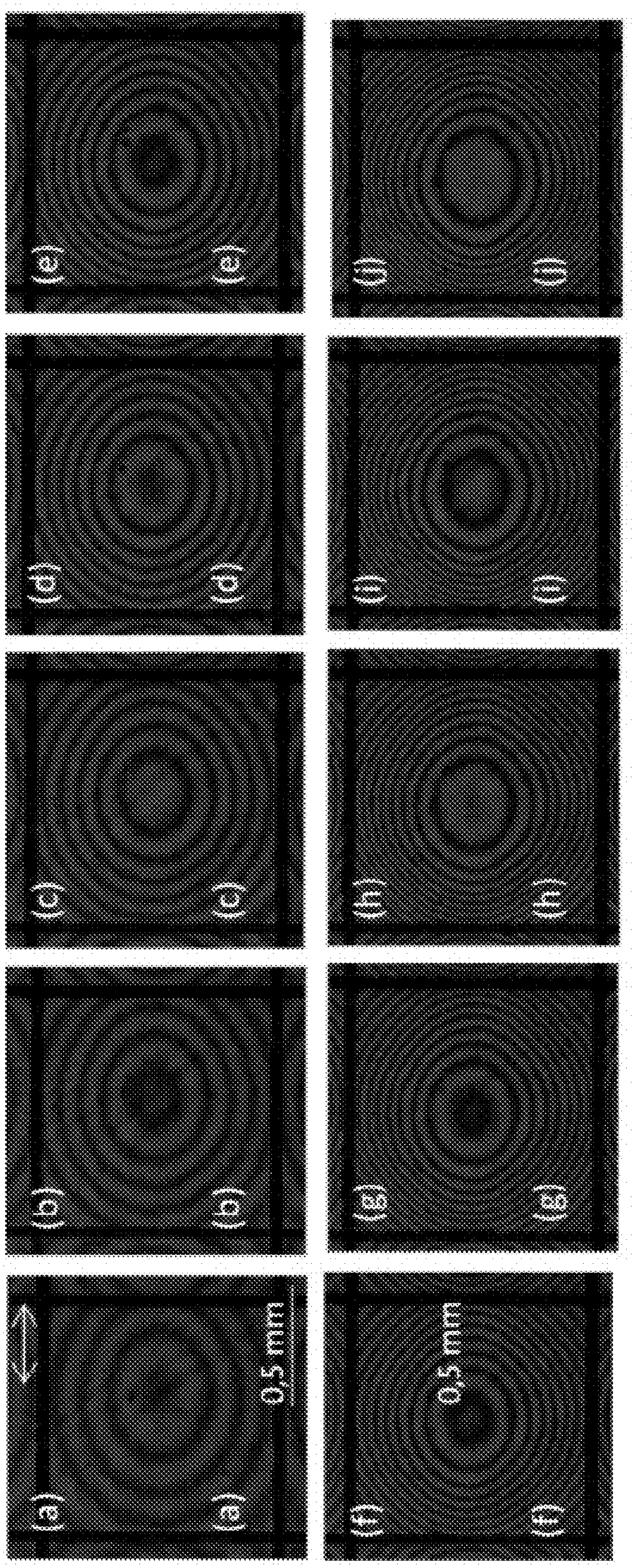
FIG. 9*d* illustrates few examples of various levels of optical power (represented by bright and dark rings) in a single unit (1×1 division) of the proposed device in FIG. 9*c* wherein the sample is placed between two cross oriented polarizers with the average orientation of LC molecules (so called "director") being oriented by the diagonal at 45 deg.
Figure 9E:
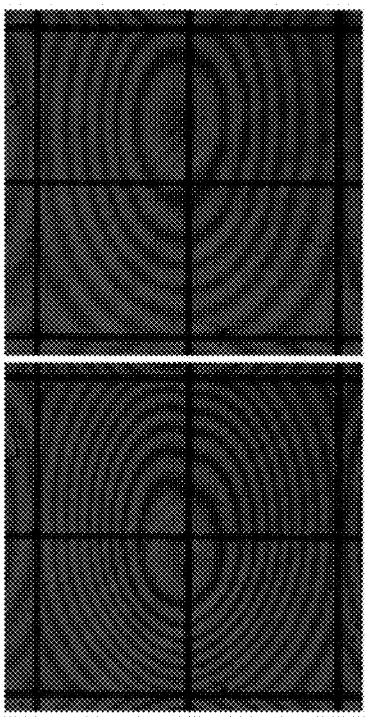
FIG. 9*e* illustrates the use of the same device, illustrated in FIG. 9*c*, to create larger aperture lenses (2×2 division) and to shift its center.
Figure 9F:
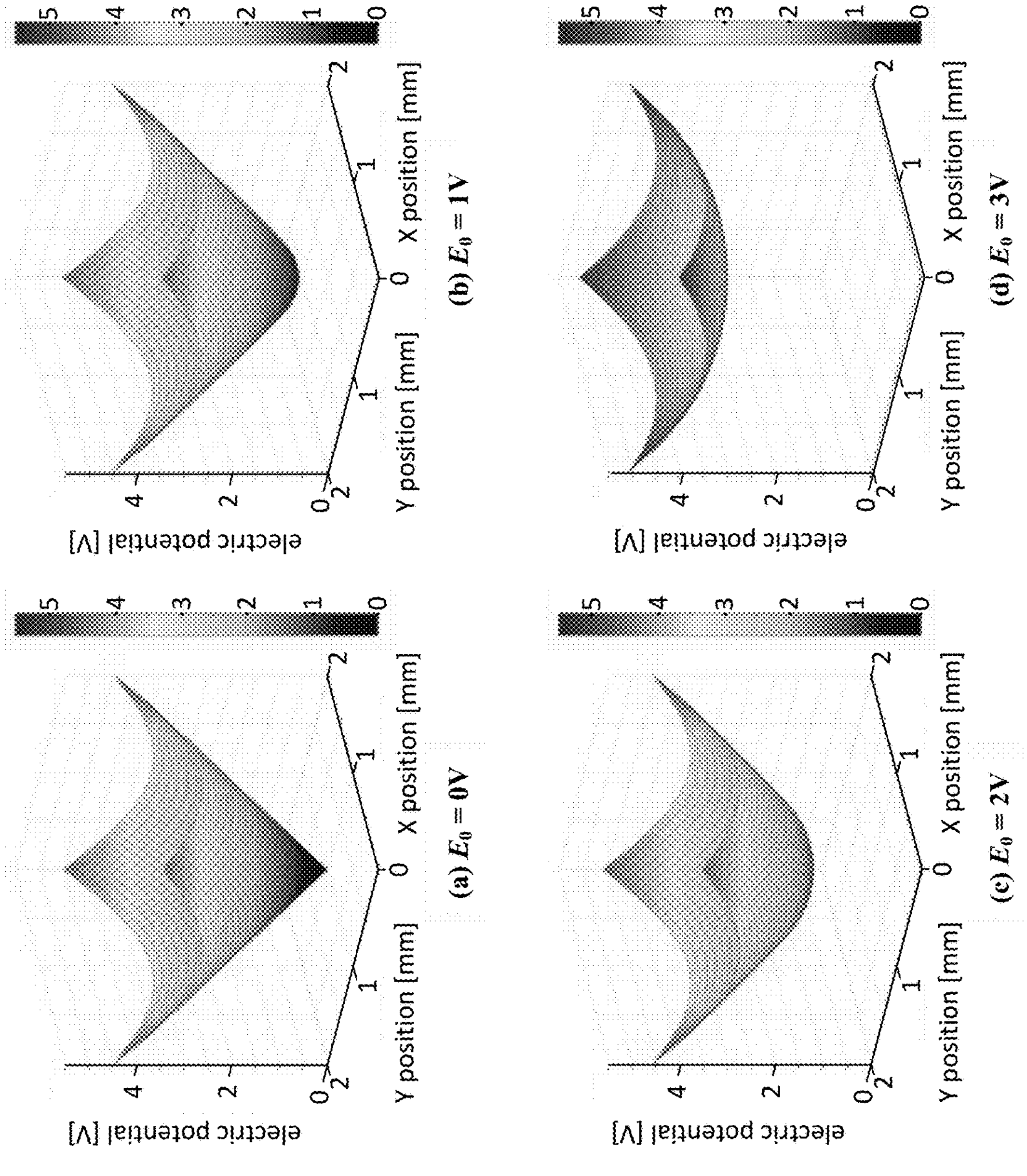
FIG. 9*f* is a composite illustration comprising graphical representations of the spatial distribution of the electric field in a device using an electrode structure as presented in FIG. 9*c*, in which the electrode contact points are driven by a given high frequency control signal similar to the one presented at FIG. 8*b* and for four different amplitudes $E_0$ of the low frequency offset signal.

FIG. 9*f* is a composite illustration comprising graphical representations of the spatial distribution of the electric potential in a device using an electrode structure as presented in FIG. 9*c*, in which the electrode contact points are driven by a high frequency control signal similar to the one presented at FIG. 8*b* and for four different amplitudes $E_0$ of the low frequency offset signal. A person skilled in the art will appreciate that careful selection of the driving signals, in both phase and amplitude, may result in many different electric field shapes that may be desirable depending on the application. While FIG. 9*h* illustrates Gaussian shape focusing lenses with increased amplitudes of $E_0$, prisms, cylindrical, axicons or other types of lenses (including, defocusing) may be similarly formed.

While the serpentine electrode structure alone may achieve a spatial distribution of the electric field sufficient to create a lens at the desired location, a HDCL coating may be added over the electrode network, such as to smooth the electric field. The HDCL can comprise, for example, a layer of $Ti_3O_5$ (approximately 100 nm thick) having a dielectric constant of about 20 or more. An alternative "smoothening" effect can be obtained also if phase-shifted signals are applied to the opposed edges of these discrete node electrodes, as illustrated in FIG. 9*f*. The combination of both approaches can be beneficial.

It will be appreciated that the control of the profile of the electric potential by the driving signals provided to the serpentine electrode structures as presented in FIGS. 9*a* to 9*c*, whether inside or outside the desired lensing zone, may be improved by activating other contacts (i.e. the contacts outside of the ones delimiting the lensing zone) instead of keeping them as floating. Additionally, the "phase relations" between the activated contact electrodes may be changed to adjust the profile (thus it may not be necessary to keep them all multiples of 90 degrees shifted one with respect to the other).

FIGS. 9*d* and 9*e* show a few examples of operations of the proposed device. Thus, FIG. 9*d* represents the creation of a small lens within a single "unit" (here, 1 mm×1 mm, formed by two pairs of cross oriented electrodes made of chrome/dark lines forming a square/to better visualize the position of the cell) and the change of its optical power (defined by the number of dark and bright rings). Acquisitions were done by using interferometric/polarimetric imaging (cell is under crossed polarizer and analyzer) under illumination by a Ne—He laser with a drive signal of (a) 100 Hz, (b) 200 Hz, (c) 300 Hz, (d) 400 Hz, (c) 500 Hz, (f) 600 Hz, (g) 700 Hz, (h) 800 Hz, (i) 900 Hz, (j) 970 Hz. The double direction arrow in (a) shows the rubbed alignment direction on the polyimide film (ground state orientation of NLC molecules). It is the same for all of the images. This shows the influence of frequency at the fixed voltage of 2.8V on the performance and optical quality using a test cell having 1 mm diameter (the phase shift here is obtained by slight frequency shift of the corresponding electrical signal). Indeed, we demonstrate here that the lens control may be obtained also by the frequency tuning.

Alternatively, as predicted above, we can use the same device to create larger aperture lenses. An example of such a lens is presented in the FIG. 9*e* (left). In this case, 2 units are used to create the lens (2 mm×2 mm) as demonstrated by dark chrome electrodes. With the appropriate control of driving parameters, we can also shift the center of the lens with respect to the electrode lines (demonstrated in the FIG. 9*e*, on the right).

In another embodiment, the combination of two above mentioned "control" substrates (with patterned ITO electrodes, instead of one being uniform) is used to build the LC sandwich and obtain electrically variable lenses or prisms.

In another embodiment, the combination of two above mentioned sandwiches (with directors being rotated by 90 degrees one with respect to the other) is used to build an LC device which has smaller or negligible polarization sensitivity (each sandwich affecting mainly one of two perpendicular polarization components of unpolarized light and the final assembly acting like a polarization insensitive device).

Dual frequency, blue phase or other liquid crystal compositions may be used to enhance the performance of the above-mentioned device.

Different types of electrodes (ITO, ZnO, Chrome, Gold, Graphene, etc.) or combination of electrodes may be used also.

The described above electrodes may be of linear rectangular or other forms. The electrode pattern may be segmented into different zones and those zones can be controlled independently or left floating.

The application of the HDCL may not be necessary in the case when phase shifted signals are applied on linear shaped multiple electrodes.

In another embodiment, the proposed lens (from FIG. 9*c*, but preferably polarization insensitive version of it, obtained by using a combination of two LC cells either with perpendicular orientations of the ground state optical axis of the LC or by using the same orientation, but with a polarization rotation component, see hereafter) is used to build ophthalmic glasses (see FIG. 10*a*) to be used in day-to-day life, in augmented reality, in virtual reality or in other specific applications (e.g., enhanced vision systems). The lens may be fabricated using thin glass or plastic substrates (which may be flexible) and it can be laminated over the surface (inner or outer) of the fixed focus ophthalmic lenses (glass or plastic). This will allow the dynamic distance accommodation as well as real time aberration correction (e.g., during an ophthalmic check-up). 1*l* is the left tunable lens and 1*r* is the right tunable lens (one for each side). 1 shows a possible position of a local tunable lens when the person is looking down-left. 2 shows the position and the diameter (dashed circle) of the lens generated for a specific distance of the object when the customer is looking on the top-left direction. 3 shows the position and the diameter (dashed circle) of the lens generated for another distance of another object when the customer is looking on the bottom-right direction. The lens can be powered for example, by solar elements (integrated on to the frame of glasses) or by a re-chargeable battery 4 (via a physical connection or inductively). 5 is the miniature driver used to control the lens as well as to optimize its performance at various conditions, including the temperature variations, etc. 6 and 7 are miniature cameras which can be used to track the orientation of human eyes and to estimate the distance of the "object" as well as its orientation. This will provide information about the position and the diameter of the dynamic lens to be generated. Such a device can enable enhanced foveal vision. A wireless interface 8 can be used to communicate with the driver 5 for configuration and/or reprogramming purposes. Ophthalmic consultation results can be used to reprogram and optimize the operation of the device along the aging of the customer or simply for customizing the device for different persons.

The LC layers of the LC device may be vertically stacked on each other and may be attached (e.g. laminated) on the inner surface of the ophthalmic lens. Plastic substrates can be used to facilitate this lamination process. The ophthalmic glasses and their frame may include the systems providing the tracking of the eye, a power storage, connections for each electrode contact points, a driver and a wireless interface.

Figure 10A:
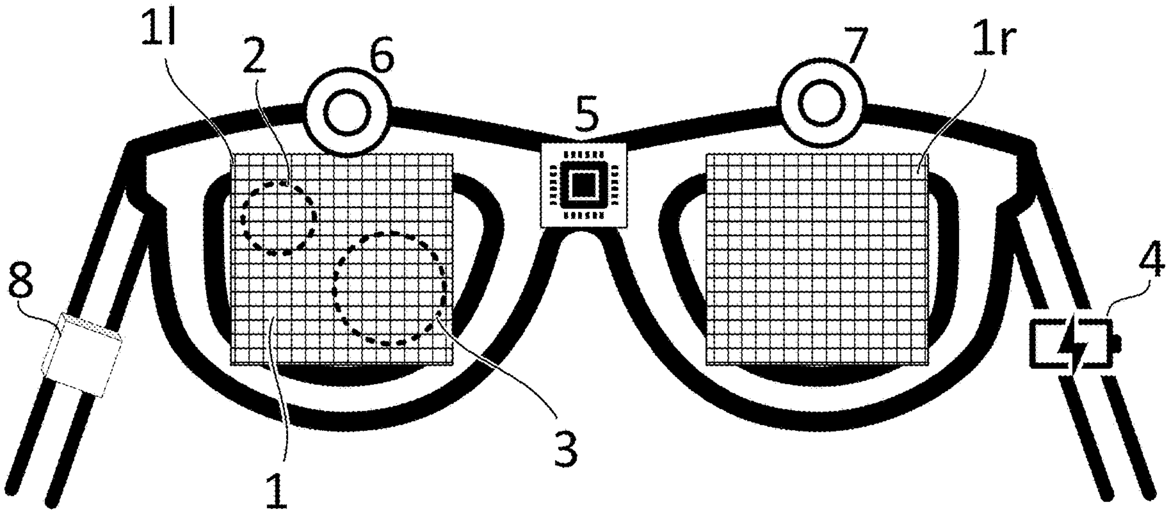
FIG. 10*a* illustrates a back view of a pair of ophthalmic glasses for day to day use, augmented reality use or other specific use having a built-in lens and eye tracking capable of focusing and adjusting unpolarized light (e.g., a combination of two cross oriented lenses, proposed in FIG. 9*c*, to insure polarization independent operation) in accordance with an embodiment of the present disclosure.
Figure 11A:
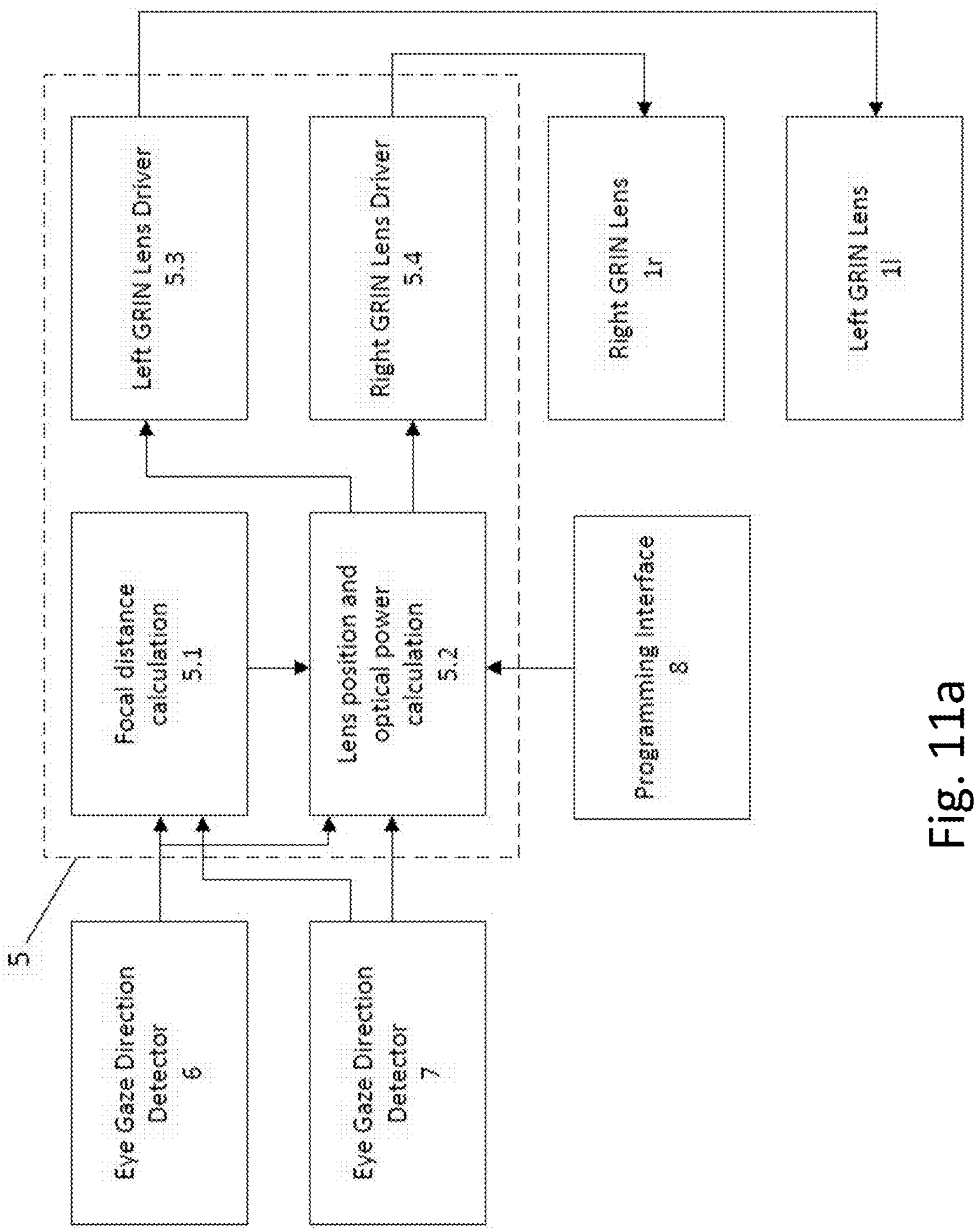
FIG. 11*a* shows a schematic block diagram of the eyeglasses shown in FIG. 10*b*.

FIG. 11*a* is a block diagram corresponding to FIG. 10*a* schematically showing a possible interconnection of elements of the vision improvement apparatus. For example, the lensing system may include the eye gaze detectors 6, 7 operably connected to the driver 5. The driver 5 may include any number of modules, such as a focal distance calculator 5.1, a lens positioning and optical power calculator 5.2 and a left and right LC lens driver 5.3, 5.4. The driver 5 may thus include a processor, memory (e.g. volatile, non-volatile, etc.), input-output controllers and any other necessary electronics to receive inputs, perform the calculations relating to the focal distance, lens positioning and optical power, and output electrode driving control signals. The memory may include program code which, when executed by the processor, may be operable to perform the desired calculations. The lensing system may further include a programming interface 8 through which the stored program code may be modified such as to change or update the existing calculation modules and/or electrode drivers. The programming interface 8 may include necessary communication electronics to connect to a remote device, either directly (e.g., Bluetooth) or through a network (e.g., through WiFi, cellular network, etc.), such that it may be programmed remotely. As such, a remotely rewritable memory element may be integrated to allow the storage of "default" parameters of drive signals. These default parameters may thereafter be re-adjusted remotely when needed, e.g., in case of change of eye performances.

Figure 10B:
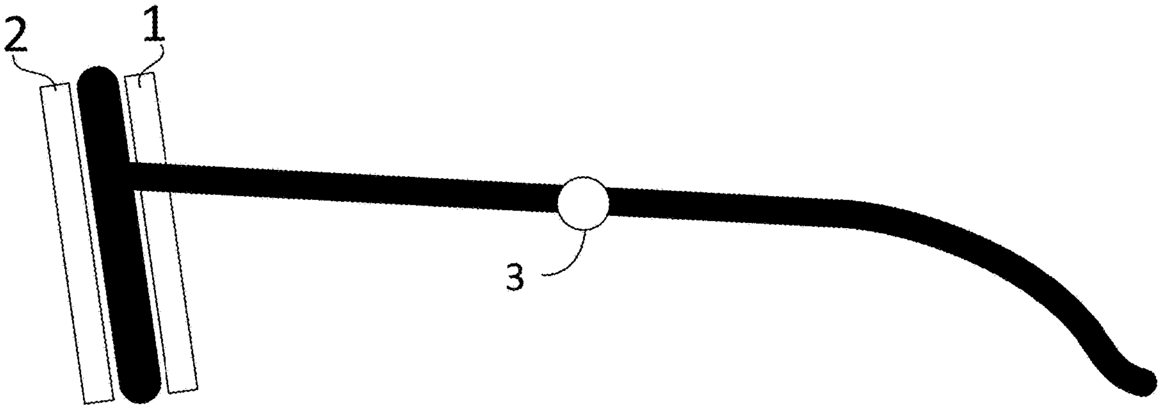
FIG. 10*b* illustrates a side view of a pair of ophthalmic glasses (similar to the one presented in FIG. 10*a*) having LC lens arrays (1 and 2) on both sides of the eye glass enabling enhanced vision (focusing and zooming) capabilities.

In another embodiment, the proposed lens (from FIG. 9*c*) is used to build ophthalmic glasses with zoom capability (see FIG. 10*b*) providing an enhanced vision ("eagle eye"). In this case, each eye glass may have two such lenses (one on each, inner and outer surfaces), so a total of 4 tunable lenses. We shall thus have two tunable lenses separated by a fixed focus lens. Their dynamic adjustment, including in opposite directions (that is, the lens 1 is focusing while the lens 2 is defocusing) may provide optical zoom and/or image stabilization functions. In both cases, the use of a touch-sensor 3 (FIG. 10*b*) may be used for the control.

In another embodiment, the proposed lens (from FIG. 9*c*) can be incorporated with large angle (panoramic or fish-eye) cameras to provide a distortion correction or selective improved resolution and visibility zone capability by activating specific areas of the lens with specific diameters.

In another embodiment, the proposed electrically variable components, such as the element represented in FIG. 7*c*, can be used also in other then «focusing» modes. For example, they can be used to generate a linear gradient of the refractive index and thus steer light. Such steering elements may be used for lighting as well as in integrated photonic/fiber circuits to adjust the efficiency of coupling between different components. For example, a flat bundle of fibers can be roughly positioned close to the entrance or exit channels of a photonic integrated circuit and an optimization software can be used to focus and steer light from each fiber to optimize the connection between the integrated circuit channels and the fiber bundle. This can be even used for relatively low quality (mechanical precision) connectors.

Figure 11B:
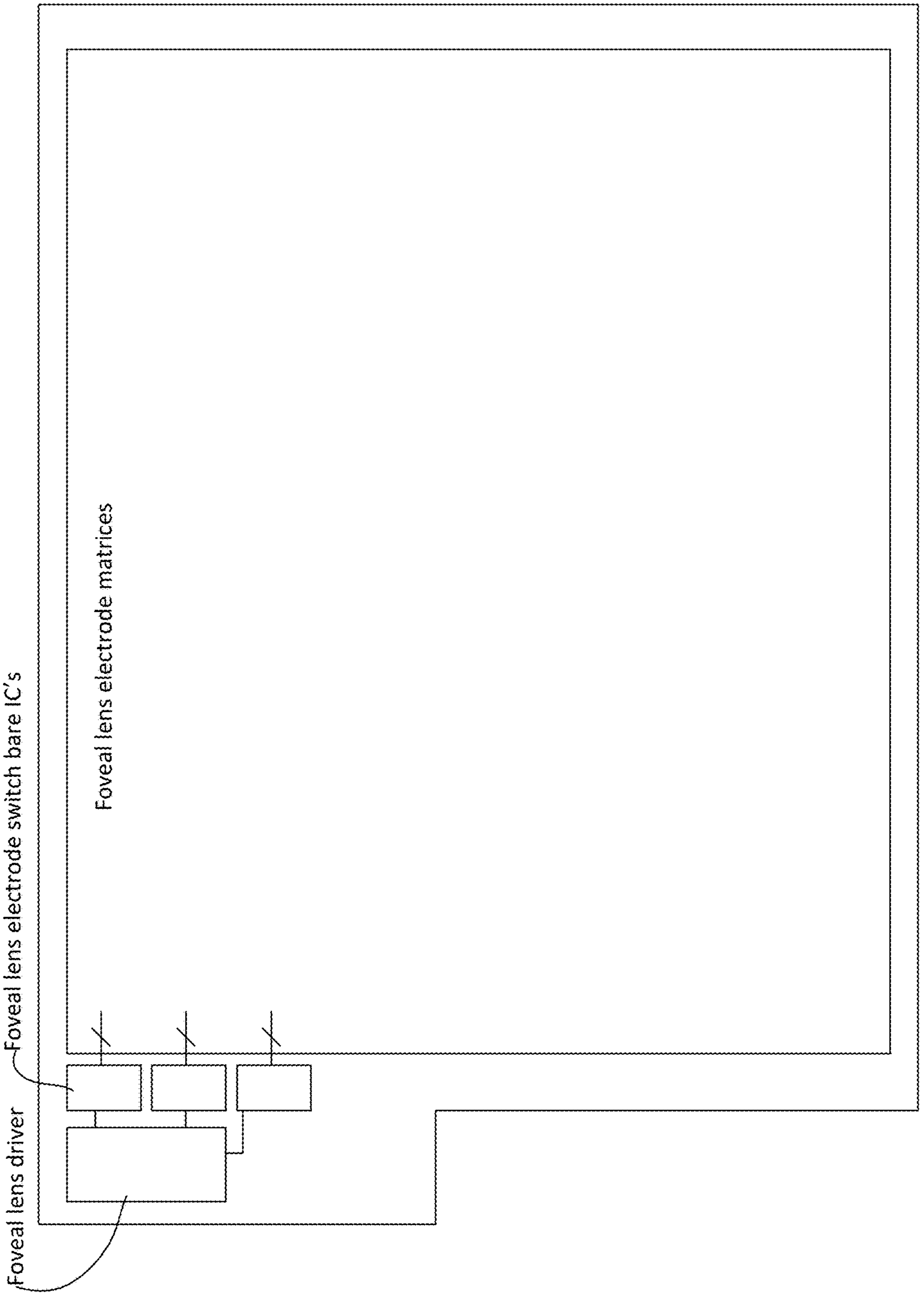
FIG. 11*b* illustrates an exemplary embodiment of the LC lens device as presented in FIG. 10*a*, including a lens driver and a number of electrode controllers.
Figure 12A:
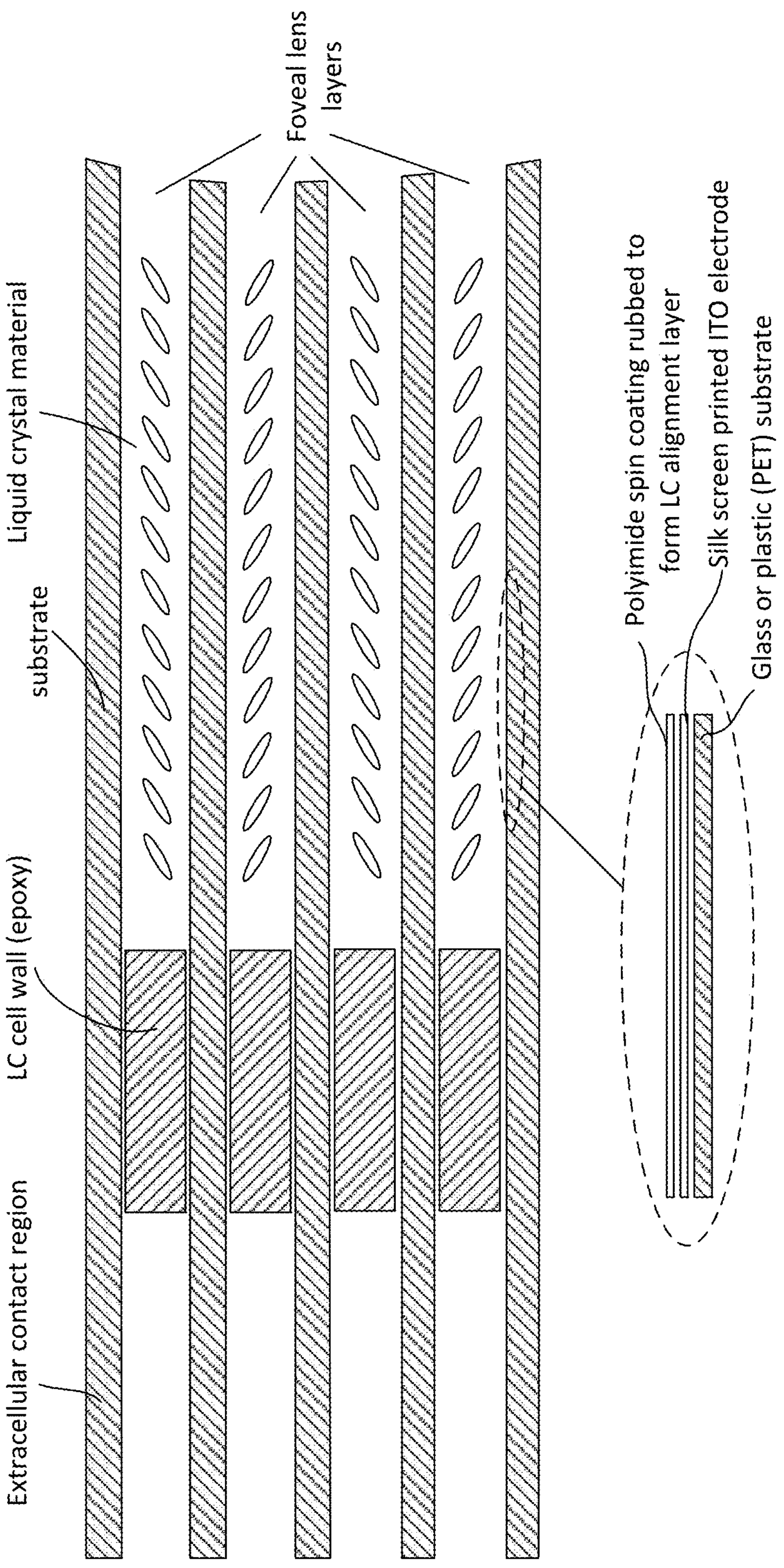
FIG. 12*a* illustrates a sectional view of an embodiment of the LC lens device as presented in FIG. 11*b*.

Now referring to FIG. 11*b* illustrates an exemplary embodiment of the LC lens device as presented in FIG. 10*a*, including a lens driver and a number of electrode controllers. FIG. 11*b* illustrates a single glass (i.e. the right glass) that may be used in a pair of ophthalmic glasses. FIG. 12*a* illustrates a sectional view of an embodiment of the LC lens device as presented in FIG. 11*b* in which the LC lens device comprises four LC cells.

In the embodiment of FIG. 12*a*, the PET plastic substrate can be about 25 μm to about 100 μm thick, while the LC material layers can range from 30 μm to about 100 μm thick. With thin substrates, a carrier substrate can be used to support each substrate during assembly. While a lens acting on natural light may require two layers of orthogonal polarization, it is possible to use four layers (or more). In this embodiment, the foveal lens illustrated uses four layers. The layers having LC of the same linear polarization can be oriented with their alignment layers in opposite directions. This can improve the lens performance. Additionally, the orientation layer director may be at 45° with respect to the direction of the electrode structure. The alignment layer may orient the liquid crystal in the desired direction (e.g., 45° with regards to the length of the electrode) while allowing the crystals to be almost parallel to the cell substrates with a small pretilt angle to insure a disclination-free operation.

As shown in FIG. 11*b*, the foveal lens electrode matrices over the glass may be a serpentine electrode structure as shown in FIG. 9*c*. As described herein, the lens driver may be operable to output one or more electrical signals with the required characteristics (e.g. frequency, amplitude, wavefront) and instruction bits defining which electrodes to power to the multiple switch matrices (switch bare IC's).

Figure 12B:
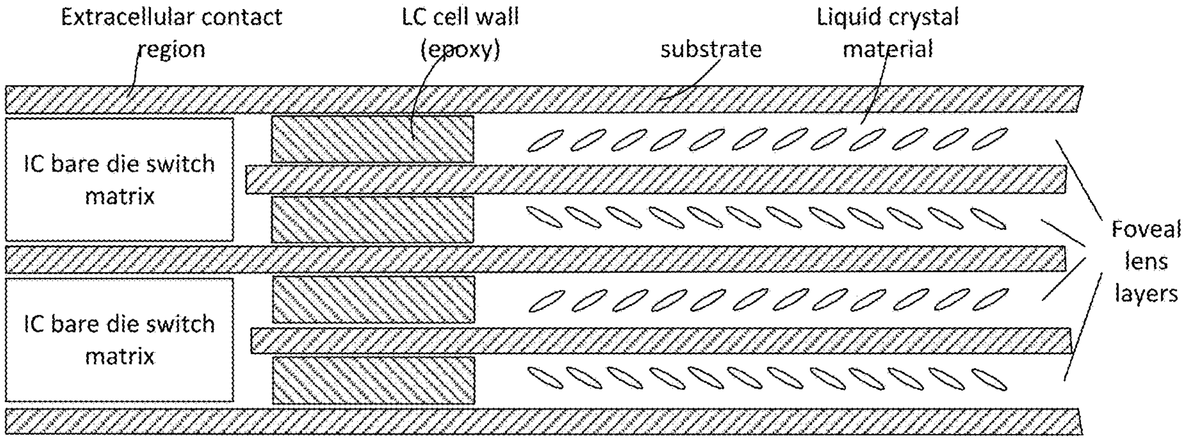
FIGS. 12*b* and 12*c* illustrates a sectional view of an embodiment of the LC lens device as presented in FIG. 11*b*, including connections between the electrode controllers and the electrodes.
Figure 12C:
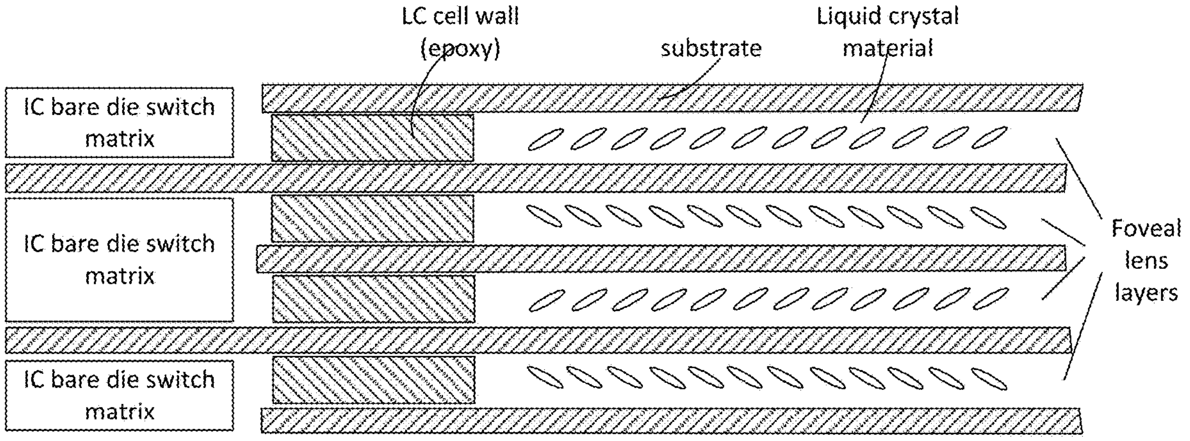

Each switch matrix may be connected to all electrode contacts on one or two LC substrate, as illustrated in the exemplary embodiment of FIGS. 12*b* and 12*c*. The switch matrix may have the necessary logic circuits to route the electrical signals received from the lens driver to the desired electrode contacts, such as to create the desired foveal lens (e.g. aperture size, optical power, etc.) at the desired location over the glass.

The top IC bare die switch matrix may be connected to both the serpentine electrode of the top substrate (first LC cell) and to the serpentine electrode structure of the bottom substrate (second LC cell). Similarly, the second IC bare die switch matrix may be connected to both the serpentine electrode of the top substrate (third LC cell) and to the serpentine electrode structure of the bottom substrate (fourth LC cell). The second figure below presents the remaining switch connections required to provide control to the remaining electrode structures. There may thus be a need for three additional switch matrices to control the bottom serpentine electrode structure of the first LC cell, the top serpentine electrode structure of the second LC cell, the bottom serpentine electrode structure of the third LC cell and the top serpentine electrode structure of the fourth LC cell.

While providing a foveal lens can add optical power for near focus, it is possible to provide a larger, positive or negative power lens, for example, in a central field of view using a Fresnel lens. As such, the ophthalmic glasses may have a number of LC layers providing the foveal lens functionalities in addition to layers providing a Fresnel lens (all LC layers may be vertically stacked and laminated on a single surface of the ophthalmic glasses). Each liquid crystal cell may be made of two substrates sandwiching a liquid crystal layer and of an electrode structure as illustrated in FIGS. 13 and 14.

Figure 13:
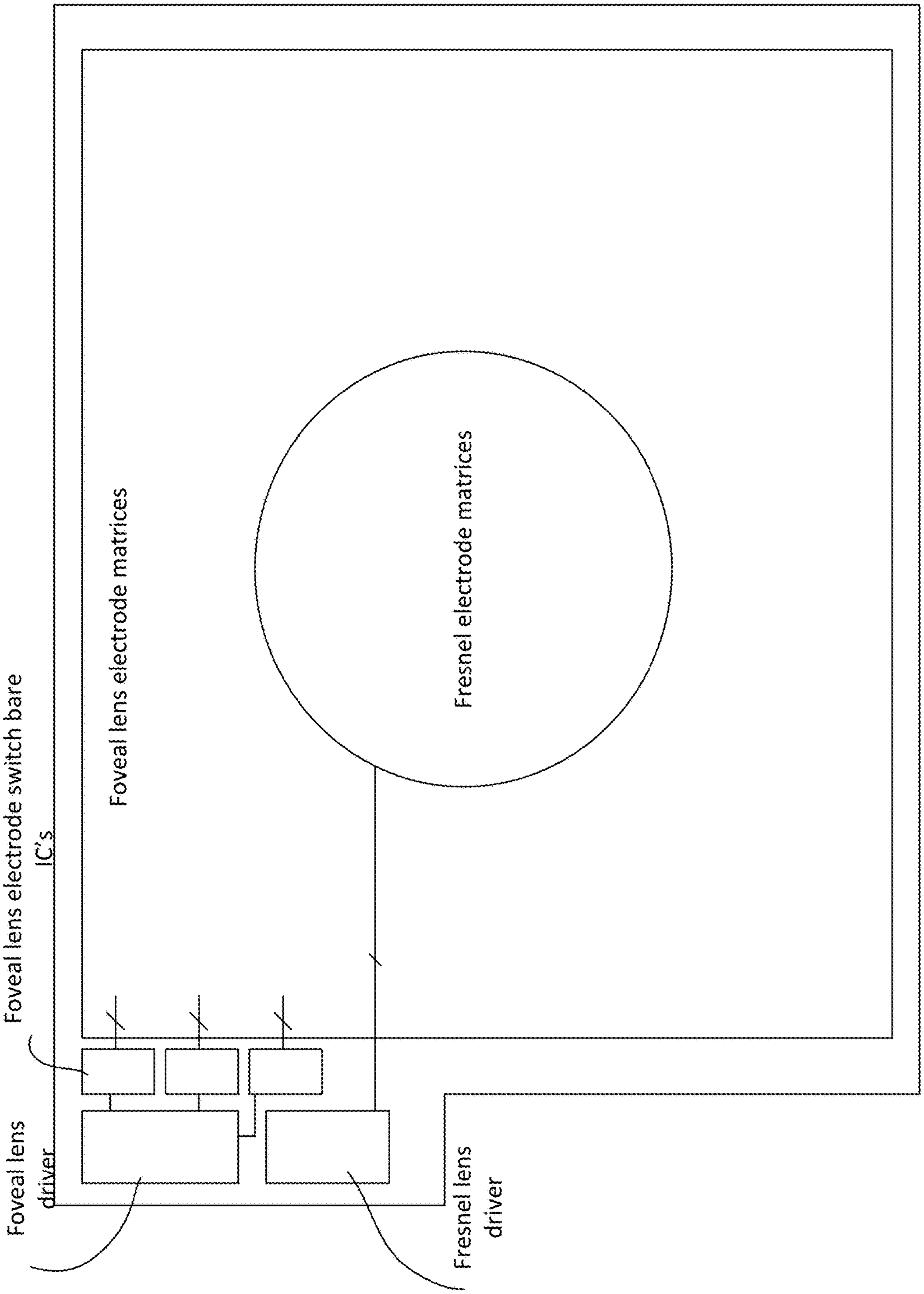
FIG. 13 illustrates an exemplary embodiment of the LC lens device as presented in FIG. 11*b*, including an additional LC lens device, such as a Fresnel lens.
Figure 14:
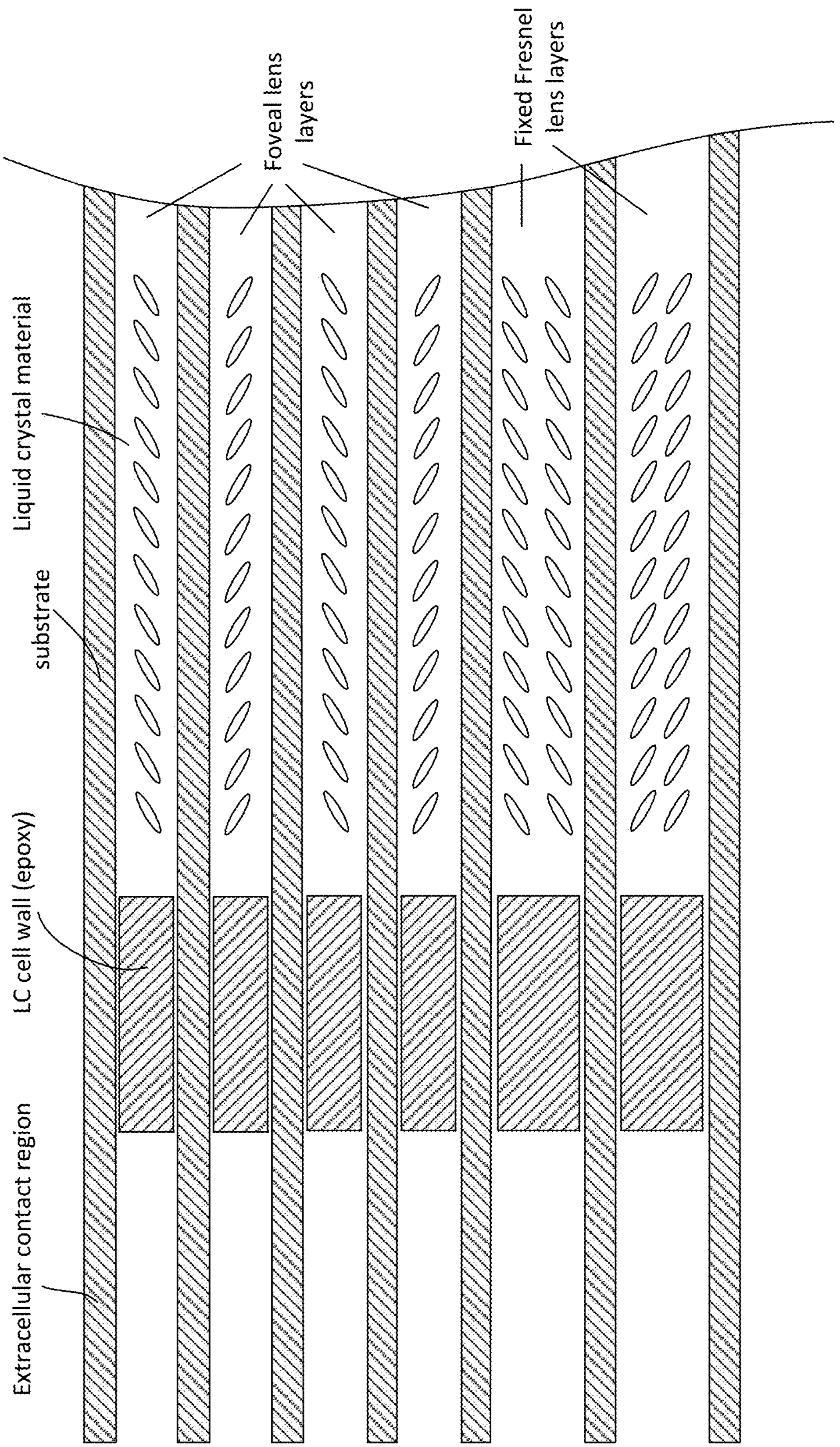
FIG. 14 illustrates a sectional view of an embodiment of the LC lens device, comprising two LC lens devices, as presented in FIG. 13.

FIG. 13 illustrates an exemplary embodiment of the LC lens device as presented in FIG. 11*b*, including an additional LC lens device, such as a Fresnel lens. In this embodiment, the lensing system may comprise an additional driver for driving the Fresnel lens (i.e. separate from the foveal lens driver). FIG. 14 illustrates a sectional view of the described device, including four foveal lens LC cells and two Fresnel lens LC cells. While shown and described as a Fresnel lens, a person skilled in the art will appreciate that any type of LC lens may be used in addition to the foveal lens device. The foveal lens device may be combined with any other electrically tunable devices (e.g., a Fresnel type lens). This may provide enhanced ophthalmic performance or provide other type of functionalities that may be desired, particularly in augmented or virtual reality glasses.

What is claimed is:

1. A liquid crystal gradient index refractive device comprising:

opposed substrates containing liquid crystal with a first serpentine electrode arrangement on a first one of the substrates and an opposed electrode on a second one of the substrates, wherein said first serpentine electrode arrangement comprises a plurality of contact points within an aperture defined by said first serpentine electrode arrangement, wherein the first serpentine electrode comprises a number of linear electrode strip segments spaced apart from one another by a pitch, each one of said number of linear strip electrode segments being connected at a first end to a first immediately neighboring one of said plurality of linear stripe electrode segments and connected at a second end to a second immediately neighboring one of said plurality of linear stripe electrode segments; and a drive circuit connected to at least two of said contact points of said first serpentine electrode arrangement and to said opposed electrode;

wherein an electric field provided by the first serpentine electrode arrangement allows for the formation of a variation in the electric field in a direction at a desired position within said aperture selected by which ones of said plurality of contact points are driven, said electric field provided by the first serpentine electrode arrangement when powered by said drive circuit allows for the formation of a variation in the electric field in a direction perpendicular to a length said number of linear strip electrode segments at the desired position within said aperture.

2. The device as defined in claim 1, wherein said opposed electrode is a second similar serpentine electrode arrangement, rotated in the plane of the cell substrate at 90° with respect to the first serpentine electrode arrangement, thereby resulting in segments of said first serpentine electrode arrangement being perpendicular to segments of said second serpentine electrode arrangement directly opposite to said segments of said first serpentine electrode arrangement.

3. The device as defined in claim 1, wherein said serpentine electrode arrangement comprises a transparent electrode material.

4. The device as defined in claim 1, wherein said substrates comprise an alignment layer providing the liquid crystal with a planar ground state alignment in a direction diagonal to said serpentine electrode arrangement.

5. The device as defined in claim 1, comprising a plurality of liquid crystal layers arranged for polarization-independent operation.

6. The device as defined in claim 1, wherein said plurality of contact points allow for at least 5 of said desired positions.

7. The device as defined in claim 6, wherein said contact points define a minimal step equal or above 0.1 mm between each one of said at least 5 of said desired positions.

8. The device as defined in claim 1, further comprising switch circuitry connected to contact points of said first serpentine electrode arrangement.

9. The device as defined in claim 8, further comprising a drive circuit connected to said switch circuitry for selectively driving said contact points.

10. The device as defined in claim 9, wherein said drive circuit provides selected phase and frequency drive signals to said contact points for creating the desired time averaged electric field spatial distribution.

11. The device as defined in claim 1, wherein said serpentine electrode arrangement comprises driven electrode segments in combination with a highly resistive layer connected to and filling a gap between said segments.

12. The device as defined in claim 1, wherein said serpentine electrode arrangement comprises driven electrode segments in combination with a transparent relatively high dielectric constant and optical index matching layer placed near the serpentine electrode arrangement and filling a gap between said segments.

13. The device as defined in claim 1, wherein said substrates are flexible, and further comprising a drive circuit and/or switch circuitry provided on one or more integrated circuit dies mounted within an extracellular region of said flexible substrates.

14. A liquid crystal gradient index refractive device comprising:

opposed substrates containing liquid crystal with a first serpentine electrode arrangement on a first one of the substrates and an opposed electrode on a second one of the substrates, wherein said first serpentine electrode arrangement comprises a plurality of contact points within an aperture defined by said first serpentine electrode arrangement; and a drive circuit connected to said contact points of said first serpentine electrode arrangement for selectively driving said contact points, wherein said drive circuit provides selected phase and frequency drive signals to said contact points for creating a desired time averaged electric field spatial distribution wherein an electric field provided by the first serpentine electrode arrangement allows for the formation of a variation in the electric field in a direction at a desired position within said aperture selected by which ones of said plurality of contact points are driven.

15. An eyeglass lens having a concave surface and a liquid crystal gradient index refractive device in contact with said concave surface, said liquid crystal gradient index refractive device comprising:

opposed substrates containing liquid crystal with a first serpentine electrode arrangement on a first one of the substrates and an opposed electrode on a second one of the substrates, wherein said first serpentine electrode arrangement comprises a plurality of contact points within an aperture defined by said first serpentine electrode arrangement, wherein the first serpentine electrode comprises a number of linear electrode strip segments spaced apart from one another by a pitch, each one of said number of linear strip electrode segments being connected at a first end to a first immediately neighboring one of said plurality of linear stripe electrode segments and connected at a second end to a second immediately neighboring one of said plurality of linear stripe electrode segments; and a drive circuit connected to at least two of said contact points of said first serpentine electrode arrangement and to said opposed electrode;

wherein an electric field provided by the first serpentine electrode arrangement allows for the formation of a variation in the electric field in a direction at a desired position within said aperture selected by which ones of said plurality of contact points are driven, said electric field provided by the first serpentine electrode arrangement when powered by said drive circuit allows for the formation of a variation in the electric field in a direction perpendicular to a length said number of linear strip electrode segments at the desired position within said aperture.

16. A vision-improvement apparatus comprising:

an eye-tracking device;

a rechargeable power source;

a polarization insensitive lens device composed of lenses comprising:

opposed substrates containing liquid crystal with a first serpentine electrode arrangement on a first one of the substrates and an opposed electrode on a second one of the substrates, wherein said first serpentine electrode arrangement comprises a plurality of contact points within an aperture defined by said first serpentine electrode arrangement;

wherein an electric field provided by the first serpentine electrode arrangement allows for the formation of a variation in the electric field in a direction at a desired position within said aperture selected by which ones of said plurality of contact points are driven; and a driver receiving an eye-position signal from the eye-tracking device and providing a drive signal to each contact points of said serpentine electrode arrangements to cause a lens of a suitable optical power to appear on the desired position of said lens device for focussing an image onto a foveal region of the eye.

17. The apparatus as defined in claim 16, wherein said polarisation insensitive lens device is integrated into an "ophthalmic" glass system from one side of glasses to provide accommodative vision and aberration correction by using eye tracking system and powering and driving electronics.

18. The apparatus as defined in claim 16, wherein said polarisation insensitive lens device is integrated from both sides of glasses to provide accommodative vision, aberration correction, magnification and enhanced vision.

19. The apparatus as defined in claim 16, wherein said polarisation insensitive lens device is driven with time sequential addressing phase shifted electrical signals to create the local lens effect mainly in the desired region of the device.

* * * * *